(12) United States Patent
Boon

(10) Patent No.: US 6,259,734 B1
(45) Date of Patent: Jul. 10, 2001

(54) IMAGE PROCESSING METHOD, IMAGE PROCESSING APPARATUS, AND DATA STORAGE MEDIA

(75) Inventor: Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/283,982

(22) Filed: Apr. 2, 1999

(30) Foreign Application Priority Data

Apr. 3, 1998 (JP) ................................... 10-091983

(51) Int. Cl.[7] ..................................... H04N 7/12

(52) U.S. Cl. .......................... 375/240; 382/232; 382/236; 382/238

(58) Field of Search .................................. 348/404, 407, 348/699, 718; 382/238

(56) References Cited

U.S. PATENT DOCUMENTS

| | | | |
|---|---|---|---|
| 5,398,079 | * 3/1995 | Liu et al. ........................... | 348/699 |
| 5,532,747 | * 7/1996 | Yoon et al. ......................... | 348/416 |
| 6,078,694 | * 6/2000 | Takahashi et al. ................... | 382/238 |
| 6,081,551 | * 6/2000 | Etoh ................................. | 375/240 |
| 6,184,935 | * 2/2001 | Iaquinto et al. .................... | 348/441 |

FOREIGN PATENT DOCUMENTS 06022296    1/1994 (JP).

* cited by examiner

Primary Examiner—Chris Kelley
Assistant Examiner—Shawn S. An
(74) Attorney, Agent, or Firm—Wenderoth, Lind & Ponack, L.L.P.

(57) ABSTRACT

An image processing method for decoding coded image data in block units each comprising M×N pixels (M,N=positive integers), comprises: a restoration process for restoring the coded image data to generate restored data of a target block to be decoded; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block by adding the restored data of the target block and the reproduced image data of the corresponding prediction block. In the prediction process, reproduced image data of a prediction block specified by a motion vector having fractional pixel precision are generated in accordance with pixel data of only M×N pixels included in a reference region of the reference frame, the region having the same size as the target block. Thereby, the amount of operations for interpolation of pixel values in the reference frame or the access band width to a frame memory is reduced without degrading precision of prediction data obtained from image data of the reference frame stored in the frame memory.

7 Claims, 18 Drawing Sheets

IMAGE PROCESSING METHOD, IMAGE PROCESSING APPARATUS, AND DATA STORAGE MEDIA

FIELD OF THE INVENTION

The present invention relates to image processing methods, image processing apparatuses, and image processing media and, more particularly, to a method and an apparatus for performing motion compensation according to the operation load when subjecting an image signal to inter-frame predictive decoding or inter-frame predictive coding. The invention also relates to a data storage medium which contains a program implementing such image signal decoding or coding by software.

BACKGROUND OF THE INVENTION

In order to store or transmit digital image data with efficiency, it is necessary to compressively encode the digital image data. As a typical method for compressively coding digital image data, there is discrete cosine transformation (DCT) represented by JPEG (Joint Photographic Experts Group) or MPEG (Moving Picture Experts Group). Besides, there are waveform coding methods such as sub-band coding, wavelet coding, and fractal coding.

Further, in order to eliminate redundant image data between adjacent frames (images), inter-frame predictive coding using motion compensation is carried out. To be specific, a pixel value (pixel data) of a pixel in the present frame is expressed by using a difference between this pixel value and a pixel value (pixel data) of a pixel in the previous frame, and this difference value (difference data) is subjected to waveform coding.

A brief description will be given of an image coding method and an image decoding method, based on MPEG1 of the like, including DCT with motion compensation.

In the image coding method, initially, input image data corresponding to one frame to be coded (image space corresponding to one frame) is divided into image data corresponding to a plurality of macroblocks (image spaces each having the size of 16×16 pixels), and the image data are compressively coded macroblock by macroblock. To be specific, the image data corresponding to one macroblock is further divided into image data corresponding to four subblocks (image spaces each having the size of 8×8 pixels), and the image data are subjected to DCT and quantization, subblock by subblock, to generate quantized coefficients. This coding process is called "intra-frame coding".

At the receiving end, the quantized coefficients corresponding to the respective subblocks are subjected to inverse quantization and inverse DCT to reproduce image data corresponding to each macroblock.

Meanwhile, there is an image data coding method called "intra-framing coding". In this coding method, initially, from a frame (reference frame) which is temporally adjacent to a frame (target frame) including a target macroblock to be subjected to coding, an area comprising 16×16 pixels and having a smallest error in image data from the target macroblock is detected as a prediction macroblock, by a motion detecting method such as block matching. At this time, displacement data indicating a displacement of the prediction macroblock from the target macroblock is detected as a motion vector. Then, image data of the prediction macroblock is obtained from image data of a past frame (i.e., a frame which has already been coded) by motion compensation based on the detected motion vector.

Next, a difference in image data between the target macroblock and the prediction macroblock is obtained as difference data, and the difference data is subjected to DCT in units of 8×8 pixels to obtain DCT coefficients, and further, the DCT coefficients are quantized to obtain quantized coefficients.

Then, the quantized coefficients and the motion vector are transmitted or stored. This coding process is called "inter-frame coding".

The inter-frame coding has two prediction modes as follows: a prediction mode in which image data of a target macroblock included in a frame which is presently processed (present frame) is predicted only from image data of a previous frame which is previous to the present frame in the display order; and a prediction mode in which image data of a target macroblock is predicted from image data of two frames which are previous and subsequent to the present frame in the display order. The former is called "forward prediction mode" and the latter is called "bidirectional prediction mode".

At the receiving end, the quantized coefficients are restored to the difference data in the space domain by inverse quantization and inverse DCT. Thereafter, image data of the prediction macroblocks is obtained by motion compensation based on the motion vector, and the difference data and the image data of the prediction macroblock are added to reproduce image data of the target macroblock.

In order to increase the prediction efficiency, in other words, in order to minimize the difference (prediction error) between the image data of the target macroblock and the image data of the prediction macroblock, the motion compensation, i.e., the process to obtain the image data of the prediction macroblock in accordance with the motion vector, is performed with precision of ½ pixel.

However, since the input image data is composed of pixel values (pixel data) in units of while pixels, prediction data of ½ pixel precision must be generated by interpolation of pixel value between adjacent pixels within the reference frame. Further, when generating the prediction data of ½ pixel precision, the value of the motion vector has 0.5 pixel precision.

Although it is assumed that the quantization, DCT and the like are performed in units of 8×8 pixels in the above description, the processing unit is not restricted to 8×8 pixels. For example, those processes may be performed in units of 7×1 pixels, Hence, generally, the quantization, DCT, and the like can be performed in units of g×h pixels (g,h=positive integers). Further, although the macroblock comprises 16×16 pixels in the above description, the macroblock may comprise M×N pixels (M,N=positive integers), generally.

However, in the following description, for simplification, both the macroblock and the subblock are regarded as image spaces each comprising K×K pixels (K=positive integer). That is, it is premised that the coding, decoding, quantization, inverse quantization, DCT, and inverse DCT are performed in units of K×K pixels. Therefore, hereinafter a macroblock is simply refereed to as "a block".

FIG. 17 is a flowchart for explaining process steps in the conventional image decoding method including motion compensation.

First of all, coded image data which has been obtained by compressively coding image data by the above-mentioned coding method and then variable-length coding the compressed data, is input block by block (step S71).

Next, the coded image data corresponding to a target block is analyzed to be separated into quantized DCT coefficients (quantized coefficients), quantization scale, and motion vector, and these are respectively converted from variable-length codes to corresponding numerical values to be output (step S72).

Thereafter, the quantized coefficients are subjected to inverse quantization and inverse DCT in units of K×K pixels, and difference data in a space domain corresponding to the target block and comprising KK pieces of values (pixel data) are output (step S73).

Next, prediction data for the target block is generated from image data of the reference frame by motion compensation. When generating prediction data of ½ pixel precision, reference pixel values more than K×K are obtained from the reference frame.

That is, in the conventional decoding method, prediction data having ½ pixel precision in both the horizontal and vertical directions is generated as follows. Initially, K'×K' pixels are obtained from the position of a pixel specified according to the integer parts of the values of the motion vector in the reference frame (step S74), and the K'×K' pixel values so obtained are subjected to interpolation, such as bilinear interpolation, to generate prediction data of ½ pixel precision (step S75). In this method, K'=K+1.

Then, the prediction data is added to the difference data to generate reproduced image data of the target block (step S76).

Thereafter, it is decided whether or not the target block is the last block in the last frame among the frames composing the image (step S77). Then the target block is not the last block, the processes in steps S71~S77 are carried out again. When the target block is the last block, decoding of the coded image data is ended.

Next, the pixel value interpolation process in steps S74 and S75 will be described in more detail by using FIGS. 18(a)~18(c).

For simplification, it is assumed that the unit of decoding (K×K pixels) is 8×8 pixels, and the motion vector MVt of the target block has, as its values, positional vectors (a,b) on the coordinates of the present frame and the previous frame (reference frame) which are image spaces of the same size. The value a is composed of an integer part x and a fraction part u, and the numerical value b is composed of an integer part y and a fraction part v. Further, since the horizontal and vertical components of the motion vector MVt of the target block have ½ pixel precision, the fraction parts u and v can take 0 or 5.

To generate prediction data specified by the motion vector MVt, the value (a,b) of the motion vector are added to the coordinates (a0,b0) of the upper-left corner Pt0 of the target block Tb on the target frame Tf (refer to FIG. 18(a)), and the coordinates (a0+a,b0+b) of the reference point Pt1, which are obtained as the result of the addition, are regarded as the coordinates of the upper-left corner Py of the prediction block Yb in the reference frame SF (refer to FIGS. 18(b) and 18(c)).

Hereinafter, a description is given of the case where the integer parts x and y of the motion vector MVt are positive integers, and the fraction parts u and v are 5.

Initially, the positive parts (x,y) of the motion vector are added to the coordinates (a0,b0) of the upper-left corner Pt0 of the target block Tb to generate the coordinates (a0+x,b0+y) of the reference position Pt1 on the target frame TF. Next, by using, as a reference, the positions Ps on the reference frame SF which corresponds to the reference position Pt1 on the target frame TF, a reference region Sr which comprises (K+1)×(K+1) pixels and has the position Ps at the upper-left corner, is obtained. Since K=8, the reference region SR includes 9×9 original pixels (pixels originally included in the reference frame) which are shown by ○ in FIG. 18(c).

Further, since both of the fraction parts u and v of the motion vector Mvt are 5, the reference region Sr needs interpolation pixels (fractional pixels) shown by X, which are arranged among the original pixels, at intervals of 0.5 pixel, along the horizontal and vertical directions.

So, by using two-dimensional interpolation for averaging the pixel values of four original pixels 806~809 positioned at apexes of a rectangle, the pixel value of an interpolation pixel 801 positioned in the center of the rectangle is generated. In this way, K×K (K=8) pieces of interpolation pixels are generated in the reference region Sr, and the pixel values of these interpolation pixels are obtained as prediction data for the target block Tb (i.e., pixel data of the prediction block Yb specified by the motion vector Mvt of fractional pixel precision). In this case, the tap length of a filter used for the interpolation is 2 in both of the horizontal and vertical directions. Generally, the number of pixels in the horizontal and vertical directions in the reference region, which pixels are required for interpolation, is represented by K+(filter's tap length)/2.

Further, when only one of the fraction parts u and v of the motion vector MVt is 5, the pixel values of interpolation pixels are obtained by one-dimensional interpolation (bilinear interpolation). To be specific, the pixel value of one interpolation pixel is generated from the pixel values of two adjacent original pixels. In this case, only the number of pixels in one of the horizontal and vertical directions of the reference region Sr becomes K+(filter's tap length)/2, while the number of pixels in the other direction becomes K.

In the above-described motion compensation including generation of pixel values of interpolation pixels, high-speed processing and high-speed access to memory are demanded.

That is, in order to generate pixel data of a prediction block comprising K×K pixels and having the same size as a block being the unit of decoding or coding, the pixel value (pixel data) of K'×K' pixels (K'=K+(filter's tap length)/2) must be obtained and, therefore, it is necessary to achieve high-speed access to the memory or to increase the access band width of the memory (i.e., the bit number in parallel access wherein plural bis in the memory are simultaneously accessed).

Further, since the interpolation is performed by using K'×K' pixel values larger than the pixel number (K×K) as the unit of decoding or coding, the quantity of operations in these processes increases.

Meanwhile, besides the image processing technique based on MPEG1 as described above, there has recently been proposed a compressive coding method as an image processing technique based on MPEG4. In the coding method, image data corresponding to a plurality of objects composing an image of one frame are compressively coded object by object for transmission, to improve the compression efficiency of the image data and to realize object by object reproduction of the image data.

Coded image data obtained by this coding method are subjected to a decoding process adapted to the coding method, at the reproduction end. More specifically, in the decoding process, the coded image data corresponding to the respective objects are decoded, and the resultant decoded image data corresponding to the respective objects are composited to generate reproduced image data. Then, the image corresponding to one frame comprising the respective objects is displayed according to the reproduced image data.

As described above, the object-by-object coding method enables the reproduction (decoding) end to generate a composite image by combining optional objects as desired, whereby editing a moving picture is facilitated. Further, it is possible to display a moving picture comprising highly-important objects without reproducing relatively unimportant objects, according to the congestion of the transmission line, the performance of reproduction apparatus, and the preference of the viewer.

However, even the image processing technique based on MPEG4 has the same problem as that of the image processing technique based on MPEG1, which processes an image of one frame without dividing it into image data corresponding to objects.

SUMMARY OF THE INVENTION

The present invention is made to solve the above-described problems and it is an object of the present invention to provide an image processing method and an image processing apparatus, which can reduce the quantity of operations required for pixel value interpolation in a reference frame and reduce the access band width to a frame memory, without degrading the precision of prediction data obtained from image data of the reference frame stored in the frame memory, when performing predictive coding or decoding with motion compensation.

It is another object of the present invention to provide a data storage medium containing a program for implementing, by software, the predictive coding or decoding according to the above-described image processing method.

Other objects and advantages of the invention will become apparent from the detailed description that follows. The detailed description and specific embodiments described are provided only for illustration since various additions and modification within the scope of the invention will be apparent to those of skill in the art from the detailed description.

According to a first aspect of the present invention, there is provided an image processing method including a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This method comprises: a restoration process for restoring the coded image data to generate restored data for a target block to be decoded; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block by adding the restored data of the target block and the reproduced image data of the corresponding prediction block. In the prediction process, reproduced image date of a prediction block specified by a motion vector having fractional pixel precision are generated in accordance with pixel data of only M×N pixels included in a reference region of the reference frame, the region having the same size as the target block. So, the number of pixel data which are obtained from the reference frame when generating prediction data is always identical to the number of pixels constituting the target block. Therefore, the access band width to the frame memory can be reduced without degrading the precision of prediction data obtained from image data of the reference frame stored in the frame memory.

Further, even when the filter (tap length) for interpolation of pixel data in the reference region is changed, since the number of pixels obtained from the reference frame as reference pixels is constant, it is not necessary to change the band width of memory access.

Furthermore, in the region outside the reference region, the quantity of operations to obtained pixel values of interpolation pixels can be reduced by repeatedly using interpolation pixels within the reference region.

Moreover, even when coded image data, which have been obtained by coding image data by using the prediction process of the conventional motion compensation at the transmitting end of the image data, are decoded by using the prediction process of the invention's motion compensation at the receiving end, since, as for prediction data, only the pixel data at the boundary of the prediction block are different from those at the transmitting end, degradation of quality of reproduced image due to the inequality of prediction data between the transmitting end and the receiving end is negligible.

According to a second aspect of the present invention, in the image processing method of the first aspect, the prediction process includes: data obtaining process for obtaining the pixel data of the M×N pixels included in the reference region having the same size as the target block, by using integer parts of the values of the motion vector having fraction pixel precision; and data reproduction process for subjecting the obtained pixel data of the M×N pixels to interpolation by using fraction parts of the values of the motion vector having fractional pixel precision, thereby generating reproduced image data of the prediction block specified by the motion vector having fractional pixel precision. Therefore, when the fraction parts of the values of the motion vector are 0, prediction data of the target block can be easily generated by performing only the data obtaining process.

According to a third aspect of the present invention, in the image processing method of the first aspect, in the data reproduction process included in the prediction process, pixel data of interpolation pixels positioned at the boundary of the reference region having the same size as the target block are generated by interpolation using only pixel data of pixels positioned adjacent to the boundary of the reference region, amongst the pixel data of the M×N pixels obtained from the reference frame. Therefore, the interpolation is facilitated.

According to a fourth aspect of the present invention, there is provided an image processing apparatus performing a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This apparatus comprises: a frame memory for storing reproduced image data of desired frames; a data analyzer for analyzing the coded image data, and outputting compressed image data and a motion vector which correspond to a target block to be decoded; a decoder for decompressing the compressed image data of the target block to generate restored data of the target block; a prediction unit for calculating reproduced image data of a prediction block as prediction values for the reproduced image data of the target block, from reproduced image data of a reference frame stored in the frame memory, in accordance with the motion vector of the target block; and an adder for adding the restored data of the target block and the reproduced image data of the corresponding prediction block to generate reproduced image data of the target block, and outputting the reproduced image data to the frame memory. The prediction unit generates reproduced image data of a prediction block specified by the motion vector having fractional pixel precision, in accordance with pixel data of only M×N pixels included in a reference region of the reference frame, the region having the same size as the target block. So, the number of pixel data which are obtained from the reference frame when generating prediction data is always identical to the number of pixels constituting the target block. Therefore, the access band width to the frame memory can be reduced without degrading the precision of prediction data obtained from image data stored in the frame memory.

Further, even when the number of pixels in the reference region used for generating one interpolation pixel is changed, since the number of pixel obtained from the reference frame as reference pixels is constant, it is not necessary to change the band width of memory access.

Moreover, even when coded image data, which have been obtained by coding image data by using the prediction process of the conventional motion compensation at the transmitting end, are decoded by using the prediction process of the invention's motion compensation at the receiving end, since, as for prediction data, only the pixel data at the boundary of the prediction block are different from those at the transmitting end, degradation of quality of reproduced image due to the inequality of prediction data between the transmitting end and the receiving end is negligible.

According to a fifth aspect of the present invention, there is provided an image processing method including a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This method comprises: a restoration process for generating restored data of a target block to be decoded, by restoring the coded image data; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block, by adding the restored data of the target block and the reproduced image data of the corresponding prediction block. In the prediction process, the arithmetic load on the decoding process is measured, and when the arithmetic load exceeds a predetermined reference value, a first data-generation process is carried out, in which reproduced image data of a prediction block specified by the motion vector of fractional pixel precision are generated according to pixel data of only M×N pixels included in a reference region of the reference frame, the region having the same size as the target block. On the other hand, when the arithmetic load does not exceed the reference value, a second data-generation process is carried out, in which reproduced image data of the prediction block are generated according to pixel data of P×Q pixels (P=positive integer larger than M, Q=positive integer larger than N) which are positioned within an extended reference region comprising the reference region of the reference frame and its peripheral region. Therefore, when the arithmetic load is low, images can be reproduced with the best quality assured. Further, when the arithmetic load is high, interruption of decoding can be avoided without substantial degradation of image quality, resulting in reproduced images of smooth motion.

According to a sixth aspect of the present invention, in the image processing method of the fifth aspect, the first data-generation process comprises: a data obtaining process for obtaining pixel data of only M×N pixels included in the reference region having the same size as the target block; and a data reproduction process for subjecting the obtained pixel data of the M×N pixels to interpolation using fraction parts of the values of the motion vector of fractional pixel precision, thereby generating reproduced image data of the prediction block specified by the motion vector having fractional pixel precision. The pixel numbers P and Q which define the vertical and horizontal size of the extended reference region are functions of the number of pixels which exist in the reference frame and are needed to generate one interpolation pixel, and the second data generation process comprises: a data obtaining process for obtaining pixel data of P×Q pixels included in the extended reference region of the reference frame, by using integer parts of the values of the motion vector having fractional pixel precision; and a data reproduction process for subjecting the obtained pixel data of the P×Q pixels to interpolation using fractional parts of the values of the motion vectors having fractional pixel precision, thereby generating reproduced image data of the prediction block specified by the motion vector having fractional pixel precision. Therefore, when the fraction parts of the values of the motion vector are 0, prediction data of the target block can be easily generated by performing only the data obtaining process.

According to a seventh aspect of the present invention, there is provided an image processing method including a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. The mode of the decoding process can be switched between a normal mode and a low power consumption mode. This method comprises: a restoration process for restoring the coded image data the generate restored data of a target block to be decoded; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block, by adding the restored data of the target block and the reproduced image data of the corresponding prediction block. In the prediction process, the mode of the decoding process is detected, and when the mode of the decoding process is the low power consumption mode which suppresses the power consumption as compared with the normal mode, a first data-generation process is carried out, in which reproduced image data of a prediction block specified by the motion vector of fractional pixel precision are generated in accordance with pixel data of only M×N pixels included in a reference region of the reference frame, the region having the same size as the target block. On the other hand, when the mode of the decoding process is the normal mode, a second data-generation process is carried out, in which reproduced image data of a prediction block are generated in accordance with pixel data of P×Q pixels (P=positive integer larger than M, Q=positive integer larger than N) which are positioned inside an extended reference region comprising the reference region of the reference frame and its peripheral region. Therefore, when the decoding mode is the normal mode, the image can be reproduced with the best image quality-assured, by the second data-generation process. When the decoding mode is the low power consumption mode, since the first data-generation process is carried out, interruption of decoding can be avoided without substantial degradation of image quality, resulting in the reproduced image of smooth motion.

According to an eighth aspect of the present invention, there is provided an image processing method for a terminal unit driven by a battery power supply, including a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This method comprises: a restoration process for restoring the coded image data to generate restored data of a target block to be decoded; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block, by adding the restored data of the target block and the reproduced image data of the corresponding prediction block. In the prediction process, the voltage of the battery power supply which drives the terminal unit is measured, and when the voltage of the battery power supply is lower than a reference voltage, a first data-generation process is carried out, in which reproduced image data of a prediction block specified by the motion vector of fractional pixel precision are generated in accordance with pixel data of only M×N pixels included in a reference region of the reference frame, the region having the same size as the target block. On the other hand, when the voltage of the battery power supply is maintained at a voltage equal to or higher than the reference voltage, a second data-generation process is carried out, in which reproduced image data of a prediction block are generated in accordance with pixel data of P×Q pixels (P=positive integer larger than M,Q=positive integer larger than N) which are positioned inside an extended reference region comprising the reference region of the reference frame and its peripheral region. Therefore, when the power of the battery power supply is sufficiently high, images can be reproduced with the best quality assured, by the first data-generation process. Further, even when the power of the battery power supply falls, since the second data-generation process is carried out, interruption of decoding can be avoided without substantial degradation of image quality, resulting in reproduced images of smooth motion.

According to a ninth aspect of the present invention, there is provided an image processing method for a terminal unit driven by a battery power supply, including a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This method comprises: a restoration process for restoring the coded image data to generate restored data of a target block to be decoded; a prediction process for selecting, as a reference frame, at least one of previous frames for which reproduced image data have been generated previously to a target frame including the target block, and calculating reproduced image data of a prediction block as prediction values for reproduced image data of the target block, from the reference frame, in accordance with a motion vector of the target block; and a reproduction process for generating reproduced image data of the target block, by adding the restored data of the target block and the reproduced image data of the corresponding prediction block. In the prediction process, the voltage of the battery power supply which drives the terminal unit is measured, and the arithmetic load on the decoding process is measured. When the voltage of the battery power supply is lower than a first reference voltage, a first data-generation process is carried out, in which reproduced image data of a prediction block specified by the motion vector of fractional pixel precision are generated in accordance with pixel data of only M×N pixels included in a reference region of the reference frame, the region having the same size as the target block. When the voltage of the battery power supply is maintained at a voltage equal to or higher than a second reference voltage which is higher than the first reference voltage, a second data-generation process is carried out, in which reproduced image data of a prediction block are generated in accordance with pixel data of P×Q pixels (P=positive integer larger than M, Q=positive integer larger than N) which are positioned inside an extended reference region comprising the reference region of the reference frame and its peripheral region. When the voltage of the battery power supply is equal to or higher than the first reference voltage and lower than the second reference voltage, the first data-generation process is performed when the arithmetic load exceeds a predetermined reference value, and the second data-generation process is performed when the arithmetic load does not exceed the reference value. Therefore, when the power of the battery power supply is sufficiently high, images can be reproduced with the best quality assured, by the second data-generation-process.

Further, when the voltage of the battery power supply falls slightly, image reproduction can be carried out by switching the process to obtain prediction data between the first data-generation process and the second data-generation process in accordance with the arithmetic load on the decoding process.

Moreover, even when the power of the battery power supply falls considerably, since the first data-generation process is performed, images of smooth motion can be reproduced without substantial degradation of image quality and interruption of decoding.

In this way, accurate control according to the voltage of the battery power supply and the arithmetic load is realized in the terminal unit driven by the battery, whereby reproduction of images of smooth motion can be carried out for many hours without substantial degradation of image quality and interruption of decoding.

According to a tenth aspect of the present invention, there is provided an image processing apparatus performing a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This apparatus comprises: a frame memory for storing reproduced image data of desired frames; a data analyzer for analyzing the coded image data, and outputting compressed image data and a motion vector which correspond to a target block to be decoded; a decoder for decompressing the compressed image data of the target block to generate restored data of the target block; a prediction unit for calculating reproduced data of a prediction block as prediction values for the reproduced image data of the target block, from reproduced image data of a reference frame stored in the frame memory, in accordance with the motion vector of the target block; and adder for adding the restored data of the target block and the reproduced image data of the corresponding prediction block to generate reproduced image data of the target block, and outputting the reproduced image data to the frame memory; and a load decision unit for measuring the arithmetic load on the decoding process to decide whether the arithmetic load exceeds a predetermined reference value or not. The prediction unit performs as follows. When the arithmetic load exceeds the reference value, the prediction unit performs a first data generation process in which reproduced image data of a prediction block specified by the motion vector of fractional pixel precision are Generated according to pixel data of only M×N pixels included in a reference region of the reference frame, the region having the same size as the target block. On the other hand, when the arithmetic load does not exceed the reference value, the prediction unit performs a second data generation process in which reproduced image data of the prediction block are generated according to pixel data of P×Q pixels (P=positive integer larger than M, Q=positive integer larger than N) which are positioned within an extended reference region comprising the reference region of the reference frame and its peripheral region, Therefore, when the arithmetic load is low, images can be reproduced with the best quality assured. Further, when the arithmetic load is high, interruption of decoding can be avoided without substantial degradation of image quality, resulting in reproduced images of smooth motion.

According to an eleventh aspect of the present invention, there is provided an image processing apparatus performing a decoding process in which coded image data obtained by compressively coding image data comprising pixel data of plural pixels by a predetermined method are decoded in block units each comprising M×N pixels (M,N=positive integers), and this decoding process is performed for each frame comprising plural blocks to generate reproduced image data of each frame. The operating mode in the decoding process can be switched between a normal operation mode and a low-power operation mode. This apparatus comprises: a frame memory for storing reproduced image data of desired frames; a data analyzer for analyzing the coded image data, and outputting compressed image data and a motion vector which correspond to a target block to be decoded; a decoder for decompressing the compressed image data of the target block to generate restored data of the target block; a prediction unit for calculating reproduced image data of a prediction block as prediction values for the reproduced image data of the target block, from reproduced image data of a reference frame stored in the frame memory, in accordance with the motion vector of the target block; an adder for adding the restored data of the target block and the reproduced image data of the corresponding prediction block to generate reproduced image data of the target block, and outputting the reproduced image data to the frame memory; and an operation mode decision unit for deciding the operation mode of the decoding process. The prediction unit performs as follows. When the operation mode of the decoding process is the low-power operation mode which suppresses the power consumption as compared with the normal mode, the prediction unit performs a first data-generation process in which reproduced image data of a prediction block specified by the motion vector of fractional pixel precision are generated in accordance with pixel data of only M×N pixels included in a reference region of the reference frame, the region having the same size as the target block. On the other hand, when the operation mode of the decoding process is the normal operation mode, the prediction unit performs a second data-generation process in which reproduced image data of a prediction block are generated in accordance with pixel data of P×Q pixels (P=positive integer larger than M, Q=positive integer larger than N) which are positioned inside an extended reference region comprising the reference region of the reference frame and its peripheral region. Therefore, when the decoding mode is the normal mode, images can be reproduced with the best quality assured, by the first data-generation process. Further, when the decoding mode is the low power consumption mode, since the second data-generation process is carried out, interruption of decoding can be avoided without substantial degradation of image quality, resulting in reproduced images of a smooth motion.

According to a twelfth aspect of the present invention, there is provided an image processing apparatus driven with a battery power supply, performing a decoding process in which coded image data obtained by compressively coding image data comprising pixel data of plural pixels by a predetermined method are decoded in block units each comprising M×N pixels (M,N=positive integers), and this decoding process is performed for each frame comprising plural blocks to generate reproduced image data of each frame. This apparatus comprises: a frame memory for storing reproduced image data of desired frames; a data analyzer for analyzing the coded image data, and outputting compresses image data and motion vector which correspond to a target block to be decoded; a decoder for decompressing the compressed image data of the target block to generate restored data of the target block; a prediction unit for calculating reproduced image data of a prediction block as prediction values for the reproduced image data of the target block, from reproduced image data of a reference frame stored in the frame memory, in accordance with the motion vector of the target block; an adder for adding the restored data of the target block and the reproduced image data of the corresponding prediction block to generate reproduced image data of the target block, and outputting the reproduced image data toward the frame memory; and a voltage decision unit for measuring the voltage of the battery power supply to decide whether the voltage exceeds a predetermined reference voltage or not. The prediction unit performs as follows. When the voltage of the battery power, supply is lower than the reference voltage, the prediction unit performs a first data-generation process in which reproduced image data of a prediction block specified by the motion vector of fractional pixel precision are generated in accordance with pixel data of only M×N pixels included in a reference region of the reference frame, the region having the same size as the target block. On the other hand, when the voltage of the battery power supply is maintained at a voltage equal to or higher than the reference voltage, the prediction unit performs a second data-generation process in which reproduced image data of a prediction block are generated in accordance with pixel data of P×Q pixels (P=positive integer larger than M, Q=positive integer larger than N) which are positioned inside an extended reference region comprising the reference region of the reference frame and its peripheral region. Therefore, when the voltage of the battery power supply is sufficiently high, images can be reproduced with the best quality assured, by the first data-generation process. Further, even when the power of the battery power supply falls, since the second data-generation process is carried out, images of smooth motion can be reproduced without substantial degradation of image quality and interruption of decoding.

According to a thirteenth aspect of the present invention, there is provided an image processing apparatus driven with a battery power supply, performing a decoding process in which coded image data obtained by compressively coding image data comprising pixel data of plural pixels by a predetermined method are decoded in block units each comprising M×N pixels (M,N=positive integers), and the decoding process is performed for each frame comprising plural blocks to generate reproduced image data of each frame. This apparatus comprises: a frame memory for storing reproduced image data of desired frames; a data analyzer for analyzing the coded image data, and outputting compressed image data and a motion vector which correspond to a target block to be decoded; a decoder for decompressing the compressed image data of the target block to generate restored data of the target block; a prediction unit for calculating reproduced image data of a prediction block as prediction values for the reproduced image data of the target block, from reproduced image data of a reference frame stored in the frame memory, in accordance with the motion vector of the target block; an adder for adding the restored data of the target block and the reproduced image data of the corresponding prediction block to generate reproduced image data of the target block, and outputting the reproduced image data to the frame memory; a load decision unit for measuring the arithmetic load on the decoding process to decide whether the arithmetic load exceeds a predetermined reference value or not; and a voltage decision unit for measuring the voltage of the battery power supply to compare the battery voltage with first and second reference voltages. The prediction unit performs as follows. When the voltage of the battery power supply is lower than a first reference voltage, the prediction unit performs a first data-generation process in which reproduced image data of a prediction block specified by the motion vector of fractional pixel precision are generated in accordance with pixel data of only M×N pixels included in a reference region of the reference frame, the region having the same size as the target block. When the voltage of the battery power supply is maintained at a voltage equal to or higher than a second reference voltage which is higher than the first reference voltage, the prediction unit performs a second data-generation process in which reproduced image data of a prediction block are generated in accordance with pixel data of P×Q pixels (P=positive integer larger than M, Q=positive integer larger than N) which are positioned inside an extended reference region comprising the reference region of the reference frame and its peripheral region. When the voltage of the battery power supply is equal to or higher than the first reference voltage and lower than the second reference voltage, the first data-generation process is performed when the arithmetic load exceeds a predetermined reference value, and the second data-generation process is performed when the arithmetic load does not exceed the reference value. Therefore, when the power of the battery power supply is sufficiently high, images can be reproduced with the best quality assured, by the second data-generation process.

Further, when the voltage of the battery power supply falls slightly, image reproduction can be carried out by switching the process to obtain prediction data between the first data-generation process and the second data-generation process in accordance with the arithmetic load on the decoding process.

Moreover, even when the power of the battery power supply falls considerably, since the first data-generation process is performed, images of smooth motion can be reproduced without substantial degradation of image quality and interruption of decoding.

In this way, accurate control according to the voltage of the battery power supply and the arithmetic load is realized in the terminal unit driven by the battery, whereby reproduction of images of smooth motion can be carried out for many hours without substantial degradation of image quality and interruption of decoding.

According to a fourteenth aspect of the present invention, there is provided an image processing method including a coding process in which image data comprising pixel data of plural pixels acre compressively coded in block units each comprising M×N pixels (M,N=positive integers), and the coding process is performed for each frame comprising plural blocks to generate coded image data corresponding to each frame. This method comprises: subtraction process for subtracting image data of a prediction block as prediction values, from image data of a target block to be coded, thereby generating difference data of the target block; restoration process for generating restored data of the target block by decoding compressive data obtained by compressing the difference data; local reproduction process for adding the restored data of the target block and the image data of the corresponding prediction block to generate locally reproduced data of the target block; and prediction process for selecting, as a reference frame, at least one of previous frames for which locally reproduced data have been generated previously to a target frame including the target block, and calculating image data of a prediction block as prediction values for the target block, from the reference frame, in accordance with a motion vector of the target block. In the prediction process, image data of a prediction block specified by the motion vector having fractional pixel precision are generated in accordance reference with pixel data of only M×N included in a reference region of the reference frame, the region having the same size as the target block. So, the number of pixel data obtained from the reference frame when generating prediction data is identical to the number of pixels constituting the target block. Therefore, the same effects as those mentioned for the first aspect are achieved, for example, the access band width to the frame memory can be reduced without degrading the precision of prediction data obtained from image data of the reference frame stored in the frame memory.

According to a fifteenth aspect of the present invention, there is provided an image processing apparatus performing a coding process in which image data comprising pixel data of plural pixels are compressively coded in block units each comprising M×N pixels (M,N=integers), and the coding process is performed for each frame comprising plural blocks to generate coded image data corresponding to each frame. This apparatus comprises: a subtracter for subtracting image data of a prediction block as prediction values for a target block to be coded, from image data of the target block, thereby generating difference data of the target block; a data compressor for compressing the difference data of the target block to generate compressed data of the target block; a data decompressor for decompressing the compressed data of the target block to generate restored data of the target block; an adder for adding the restored data of the target block and the image data of the corresponding prediction block to generate locally reproduced data of the target block; a frame memory for storing the locally reproduced data of desired frames; and a prediction unit for calculating image data of the prediction block as prediction values for the image data of the target block, from the locally reproduced data of a reference frame stored in the frame memory. The prediction unit generates image data of a prediction block specified by the motion vector having fractionally pixel precision, in accordance with pixel data of only M×N pixels included in a reference region of the reference frame, the region having the same size as the target block. So, the number of pixel data obtained from the reference frame when generating prediction data is identical to the number of pixels constituting the target block. Therefore, the same effects as those mentioned for the fourth aspect are achieved, for example, the access band width to the frame memory can be reduced without degrading the precision of prediction data obtained from image data stored in the frame memory.

According to a sixteenth aspect of the present invention, there is provided an image processing method including a coding process in which image data comprising pixel data of plural pixels are compressively coded in block units each comprising M×N pixels (M,N=integers), and the coding process is performed for each frame comprising plural blocks to generate coded image data corresponding to each frame. This method comprises: subtraction process for subtracting image data of a prediction block as prediction values for a target block to be coded, from image data of the target block, thereby generating difference data of the target block; restoration process for generating restored data of the target block by restoring compressed data obtained by compressing the difference data; local reproduction process for generating locally reproduced data of the large block by adding the restored data of the target block and reproduced image data of the corresponding prediction block; and predication process for selecting, as a reference frame, at least one of the previous frames for which locally reproduced data have been generated previously to a target frame including the target block, and calculating image data of a prediction block as prediction values for the image data of the target block, from the reference frame, in accordance with a motion vector of the target block. In the prediction process, the arithmetic load on the decoding process is measured, and when the arithmetic load exceeds a predetermined reference value, a first data generation process is carried out, in which image data of a prediction block specified by the motion vector of fractional pixel precision are generated according to pixel data of only M×N pixels included in a reference region of the reference frame, the region having the same size as the target block. On the other hand, when the arithmetic load does not exceed the reference value, a second data generation process is carried out, in which image data of the prediction block are generated according to pixel data of P×Q pixels (P=positive integer larger than M, Q=positive integer larger than N) which are positioned within an extended reference region comprising the reference region of the reference frame and its peripheral region. Therefore, when the arithmetic load is low, image data can be coded with the best image quality assured. Further, when the arithmetic load is high, interruption of coding can be avoided without substantial degradation of image quality.

According to a seventeenth aspect of the present invention, there is provided an image processing apparatus performing a coding process in which image data comprising pixel data of plural pixels are compressively coded in block units each comprising M×N pixels (M,N=integers), and the coding process is performed for each frame comprising plural blocks to generate coded image data corresponding to each frame. The apparatus comprises: a subtracter for subtracting image data of a prediction block as prediction values for image data of a target block to be coded, from the image data of the target block, thereby generating difference data of the target block; a data compressor for compressing the difference data of the target block to generated compressed data of the target block; a data decompressor for decompressing the compressed data of the target block to generate restored data of the target block; an adder for adding the restored data of the target block and the image data of the corresponding prediction block to generate locally reproduced data of target block; a frame memory for storing the locally reproduced data of desired frames; a prediction unit for calculating reproduced image data of the prediction block as prediction values for the image data of the target block, from the locally reproduced data of a reference frame stored in the frame memory, in accordance with the motion vector of the target block; and a load decision unit for measuring the arithmetic load on the coding process to decide whether the arithmetic load exceeds a predetermined reference value or not. The prediction unit performs as follows. When the arithmetic load exceeds the reference value, the prediction unit performs a first data generation process in which reproduced image data of a prediction block specified by the motion vector of fractional pixel precision are generated according to pixel data of only M×N pixels included in a reference region of the reference frame, the region having the same size as the target block. On the other hand, when the arithmetic load does not exceed the reference value, the prediction unit performs a second data generation process in which reproduced image data of the prediction block are generated according to pixel data of P×Q pixels (P=positive integer larger than M, Q=positive integer larger than N) which are positioned within an extended reference region comprising the reference region of the reference frame and its peripheral region. Therefore, when the arithmetic load is low, image data can be coded with the best image quality assured. Further, when the arithmetic load is high, interruption of coding can be avoided without substantial degradation of image quality.

According to an eighteenth aspect of the present invention, there is provided a data storage medium which contains a program implementing image processing by a computer, and the program enables the computer to perform image processing according to an image processing method determined in any of the first, second, third, fifth, sixth, seventh, eighth, ninth, fourteenth, and sixteenth aspects. Therefore, this data storage medium realizes, by software, image processing which can reduce the amount of operations for interpolation of pixel values in the reference frame or the access band width to the frame memory, without degrading the precision of prediction data obtained from image data of the reference frame stored in the frame memory, when performing predictive coding or decoding with motion compensation.

DETAILED DESCRIPTION OF THE PREFERRED EMBODIMENTS

Hereinafter, embodiments of the present invention will be described by using FIGS. 1 through 10.

Embodiment 1

Figure 1:
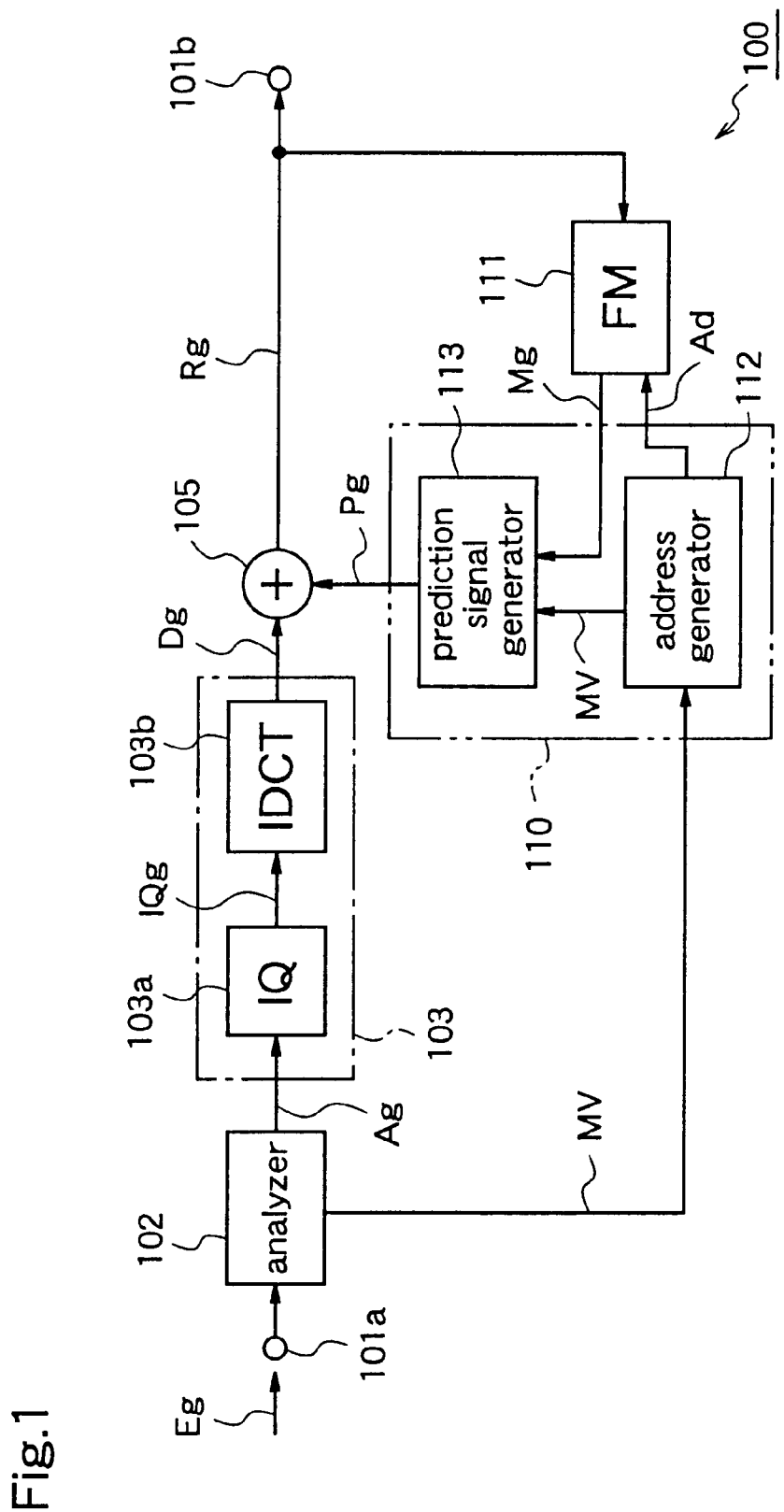
FIG. 1 is a block diagram illustrating an image decoding apparatus as an image processing apparatus according to a first embodiment of the invention.
Figure 2:
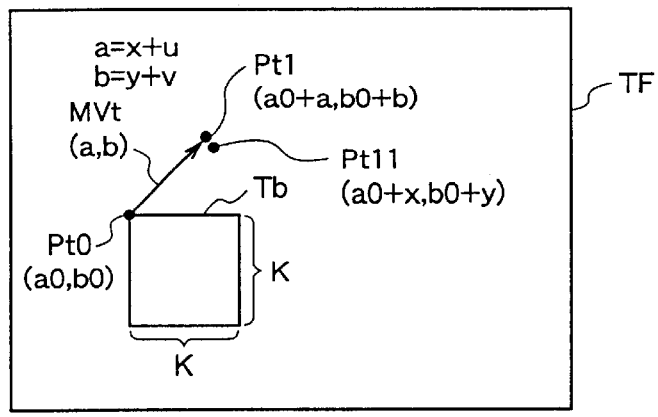
FIGS. 2(a)–2(c) are schematic diagrams for explaining motion compensation in predictive decoding by the image decoding apparatus of the first embodiment, wherein 2(a) shows a frame to be processed, 2(b) shows a reference frame, and 2(c) shows a reference region.
Figure 2:
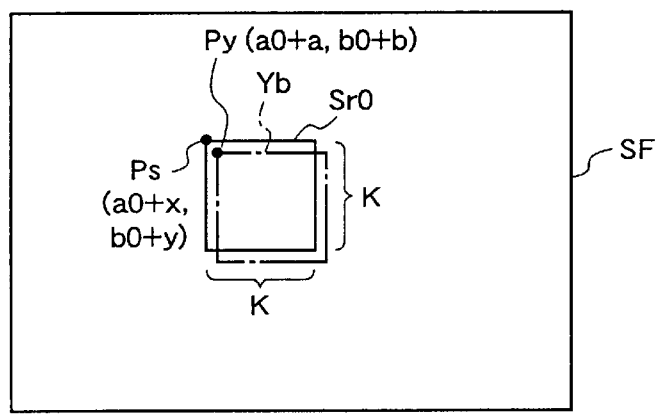
Figure 2:
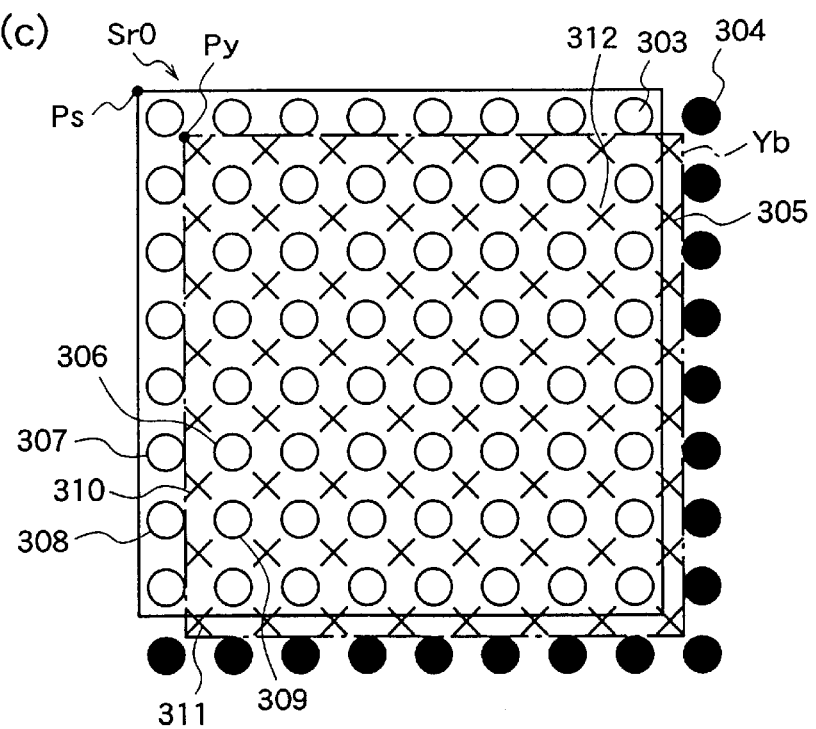

FIG. 1 is a block diagram illustrating an image decoding apparatus as an image processing apparatus according to a first embodiment of the present invention.

An image decoding apparatus 100 of this first embodiment receives coded image data, which have been obtained by compressively coding image data in a predetermined method, for every image space (macroblock) having a predetermined size (a unit of decoding), and subjects the coded image data to predictive decoding in macroblock units. The image data comprises pixel values (pixel data) corresponding to respective pixels composing each frame (image space corresponding to one frame). Further, a macroblock is an image space comprising K×K pixels and, in the following description of the invention, a macroblock is called simply as a block. For example, a macroblock comprises 16×16 pixels as described for the prior art.

The image decoding apparatus 100 includes a data analyzer 102 and decoder 103. The data analyzer 102 analyzes coded image data of a target block to be decoded, and outputs a quantization scale and quanitized coefficients (quantized DCT coefficients) as analysis data Ag of the target block, and a motion vector MV of the target block. The decoder 103 receives the analysis data Ag, and decompresses data Dg of the target block (pixel data of the decompressed block).

The decoder 103 comprises an inverse quantizer (IQ) 103a and an inverse DCT unit (IDCT) 103b. The inverse quantizer 103a inversely quantizes the quantized coefficients with the quantization scale to restore DCT coefficients IQg. The inverse DCT unit 103b subjects the DCT coefficients IQg output from the inverse quantizer 103a to inverse DCT for transforming frequency-domain data to space-domain data, thereby generating the decompressed data Dg.

Further, the image decoding apparatus 100 includes an adder 105, a frame memory 111, and a prediction unit 110. The adder 105 adds the pixel data of the decompressed block and the pixel data of the prediction block to generate reproduced data Rg of the target block (i.e., pixel data of the reproduced block). The frame memory 111 stores the pixel data of the reproduced blocks for a predetermined number of frames. The prediction unit 110 generates prediction data Pg of the target block (i.e., pixel data of the prediction block), according to the reproduced data Rg and the motion vector MV of the target block.

The prediction unit 110 comprises an address generator 112 and a prediction signal generator 113. The address generator 112 generates an access address Ad for reading stored data Mg from the frame memory 111 as reference data, according to the motion vector MC of the target block. The prediction signal generator 113 receives the reference data Mg read from the frame memory 111, and generates prediction data of the target block (pixel data of the prediction block) according to the motion vector MV.

The process of generating the prediction data by the prediction signal generator 113 will be described in more detail with reference to FIGS. 2(a)–2(c).

In the frame memory 111, reproduced data for a predetermined number of frames are stored. When generating prediction data, amongst the pixel data stored in the frame memory 111, a past frame which is previous and adjacent to the target frame TF including the target block Tb (refer to FIG. 2(a)) is used as the reference frame SF (refer to FIG. 2(b)). However, the reference frame whose pixel data are referred to when generating the prediction data, is not restricted to the past frame adjacent to the target frame. For example, in the bidirectional prediction mode, two frames adjacent to the target frame, one in the past and one in the future, are used as reference frames.

The frames TF and SF shown in FIGS. 2(a) and 2(b) are identical to those shown in FIGS. 12(a) and 12(b), respectively. Accordingly, the values of the motion vector MVt of the target block Tb are expressed by the coordinates (a,b) on the target frame TF and the reference frame SF, which frames are image spaces of the same size, and the numerical value a is composed of an integral part x and a fraction part u while the numerical value b is composed of an integral part y and a fraction part v. The integral parts x and y take positive or negative integers. Further, the horizontal components and the vertical components of the motion vector MVt of the target block Tb on the target frame TF and the reference frame SF have ½ pixel precision. In other words, the fraction parts u and v take 0 or 5.

In order to generate pixel data of a prediction block specified by the motion vector ½ pixel precision, the motion vector's values (a,b) are added to the coordinates (a0,b0) at the upper-left corner Pt0 of the target block Tb on the target frame TF (see FIG. 2(a)), and the coordinates (a0+a,b0+b) of the reference position Pt1 obtained as the result of the addition are used as the coordinates of the upper-left corner Py of the prediction block Yb on the reference frame SF (refer to FIGS. 2(b) and 2(c)).

Assuming that the integer parts x and y of the motion vector MVt of the target block Tb are positive integers and the fraction parts u and v of the motion vector MVt are 5, pixel data of the prediction block Yb specified by the motion vector MVt of decimal pixel precision are obtained by the prediction signal generator 113, as follows.

Initially, the values (x,y) of the integer parts of the motion vector MVt are added to the coordinates (a0,b0) of the upper-left corner Pt0 of the target block Tb on the target frame TF to obtain coordinates (a0+x,b0+y), and then the position Ps on the reference frame SF, which corresponds to the reference position Pt11 on the target frame TF having the coordinates (a0+x,b0+y), is obtained.

Based on the corresponding position Ps in the reference frame SF, pixel data of each pixel in the reference region Sr0 which has the position Ps at the upper-left corner and comprises K×K pixels, is obtained. Since K=8, the reference region Sr0 includes 8×8 pieces of original pixels (pixels originally included in the reference frame) shown by ○ in FIG. 2(c).

In this case, since both of the fraction parts u and v of the motion vector MVb are 5, interpolation pixels (fractional pixels) shown by x in FIG. 2(c) are needed inside the reference region Sr0 and in the vicinity of the lower side and the right side of the region Sr0, which interpolation pixels are arranged among the original pixels (○) at intervals of 0.5 pixel, along the horizontal and vertical directions.

So, according to two-dimensional interpolation for averaging the pixel values of four original pixels 306–309 positioned at apexes of a rectangle, the pixel value of an interpolation pixel 310 positioned in the center of the rectangle is generated. In this way, (K−1)×(K−1) pieces of interpolation pixels (shown by X) are generated in the reference region Sr0, as pixel values inside the prediction block Yb.

Further, in order to generate interpolation pixels outside the reference region Sr0 (e.g., pixels 305 and 311), the pixel values of original pixels which are positioned inside and adjacent to the boundary of the reference region Sr0 (e.g., pixel 303), are used as the pixel values of the interpolation pixels. To be specific, the pixel data of the pixel 304 required to generate an interpolation pixel outside the reference region Sr0 is not obtained from the pixel data inside the reference frame SF independently of the pixel data in the reference region Sr0, but the pixel data of the original pixel 303 inside the reference region Sr0 is used as the pixel value of the pixel 304.

FIG. 2(c) shows the process of generating interpolation pixels outside the reference region Sr0. In this process, as duplicates of boundary pixels positioned inside and adjacent to the reference region Sr0 (e.g., pixel 303 shown by ○), duplicate pixels (e.g., pixel 304 shown by ●) are formed outside the reference region Sr0, in positions one-pixel-interval apart from the boundary pixels. Then, interpolation pixels (shown by X) as components of the prediction block Yb are generated outside the reference region Sr0, by using the duplicate pixels and the adjacent boundary pixels.

In this case, since the tap length of a filter used for the interpolation process is 2 in both of the horizontal and vertical directions, the number of duplicate pixels (●) to be formed outside the reference region Sr0 is 1+(the number of pixels in one row and one column of the reference region Sr0).

When only one of the fraction parts u and v of the motion vector MVt is 5, the pixel values of interpolation pixels are obtained by one-dimensional interpolation (bilinear interpolation). To be specific, the pixel value of one interpolation pixel is generated from two original pixels adjacent to each other. In this case, the number of duplicate pixels positioned outside the reference region Sr0 is equal to the number of pixels in one row or one column of the reference region Sr0.

Generally, assuming that the tap number of a filter used for interpolation is T, the number of duplicate pixels is approximately equal to the number corresponding to (T/2) rows and (T/2) columns. In this case, to generate duplicate pixels, a hold method or a mirroring method is employed. In the hold method, boundary pixels positioned inside and adjacent to the boundary of the reference region Sr0 are used as they are, as pixels outside the reference region Sr0. The mirroring method uses, as duplicate pixels outside the reference region Sr0, the original pixels which are placed inside the reference region Sr0 in positions symmetrical to the positions of the duplicate pixels with the boundary of the reference region being the center of symmetry.

Although in the above description the integral parts x and y of the values of the motion vector are positive integers, the integral parts may take negative values. In this case, the coordinates (x',y') based on the integer parts x and y of the motion vector MVt, which coordinates are used for generating the normal coordinates of the reference region Sr0 of the reference frame SF, becomes integers which are smaller than and closest to the coordinates (x.u, y.v), respectively. For example, when the coordinates (x.u, y.v)=(1.5, 2.5), the coordinates (x',y')=(1,2). When the coordinate (x.u, y.v)=(−1.5,−2.5), the coordinates (x',y')=(−2,−3). Further, when the fraction parts u and v of the values of the motion vector MVt are 0, since no interpolation of pixels is needed, it is not necessary to duplicate pixels at the boundary of the reference region Sr0.

Although motion compensation of ½ pixel precision has been described in the first embodiment, it is also possible to generate similar interpolation pixels in the case where motion compensation of fractional precision, such as ¼ pixel precision, is performed. In this case, the fraction parts u and v of the values of the motion vector MVt take 0, 25, or 5.

Further, as for the outside-boundary interpolation pixels positioned outside and adjacent to the boundary of the reference region Sr0, duplicates of interpolation pixels which are inside the reference region Sr0 and closest to the outside-boundary interpolation pixels, for which pixel values have already been calculated, may be used. For example, the pixel value of the interpolation pixel 312 may be used as the pixel value of the outside-boundary interpolation pixel 305.

A description is now given of the operation.

Figure 3:
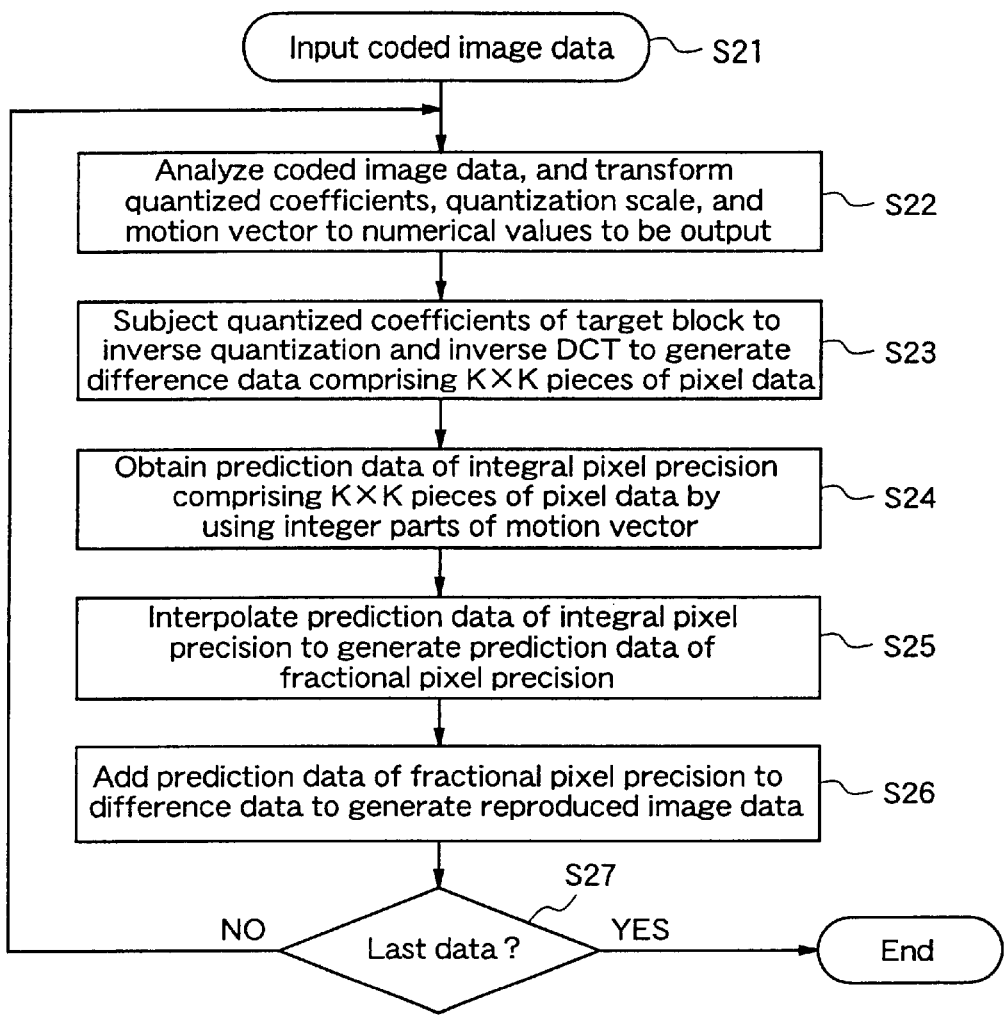
FIG. 3 is a flowchart for explaining predictive decoding by the image decoding apparatus of the first embodiment.

FIG. 3 is a flowchart for explaining a predictive decoding process according to the first embodiment of the invention.

Coded image data Eg obtained by compressively coding image data by a predetermined method, such as the above-mentioned MPEG1 method, is input to the input terminal 101a (step S21).

In this first embodiment, like MPEG1, compressive coding is performed by DCT with motion compensation and, therefore, the coded image data Eg includes a motion vector, a quantization scale, and quantized DCT coefficients.

Next, the coded image date Eg is analyzed by the analyzer 102, separated into quantized DCT coefficients, a quantization scale and a motion vector, and transformed to the corresponding numerical values to be output. As analysis data Ag of a target block to be decoded, the quantization scale and the quantized DCT coefficients are output to the decoder 103 while the motion vector MV is output to the address generator 112 of the prediction unit 110 (step S22).

In the decoder 103, the quantized coefficients of the target block are subjected to inverse quantization and inverse DCT in units of K×K pixels, whereby the quantized coefficients are restored to difference data comprising K×K pieces of pixel data (step S23). That is, in the inverse quantizer 103a, the quantized coefficients are transformed to DCT coefficients IQg by inverse quantization, and in the inverse DCT unit 103b, the DCT coefficients IQg are transformed to decompressed data Dg by inverse DCT for transforming frequency-domain data to space-domain data.

Meanwhile, in the address generator 112 of the prediction unit 110, an access address for accessing the frame memory 111 is generated according to the motion vector MV, and reference data Mg for generating a prediction block is obtained from the reproduced data stored in the frame memory 111, in accordance with the access address Ad. The reference data Mg so obtained is output to the prediction signal generator 113.

In the prediction signal generator 113, prediction data Pg for the target block (pixel data of the prediction block) is generated according to the reference data Mg and the motion vector MV (steps S24 and S25).

To be specific, when generating prediction data of ½ pixel precision, initially, K×K pieces of pixel data are obtained from the position of the original pixel in the reference region Sr0, which position is specified by the integer parts of the values of the motion vector MV on the reference frame SF (step S24). Then, the K×K pieces of pixel data so obtained are subjected to interpolation described with respect to FIGS. 2(a)–2(c), thereby generating prediction data of ½ pixel precision (step S25).

Thereafter, in the adder 105, the pixel data Pg of the prediction block and the pixel data Dg of the decompressed block are summed up, and the sum is output as pixel data Rg of the reproduced block (step S26). The pixel data Rg of the reproduced block are output from the output terminal 101b to the outside of the image decoding apparatus 100 and, simultaneously, stored in the frame memory 111.

Finally, it is decided whether or not the target block is the last block in the last frame of the image (step S27). When the target block is not the last block, the processes of step S21–S27 are repeated. When it is the last block, the decoding process is ended.

In the case of intra-frame coding, all of the prediction data, i.e., the pixel values (pixel data) of pixels composing the prediction block, are 0.

As described above, according to the first embodiment of the invention, when generating prediction data (pixel data of a prediction block) with fractional precision, only pixels positioned within a reference region Sr0 of a reference frame, the region having the same size as a target block to be decoded, are used as reference pixels, and pixel data of interpolation pixels positioned among reference pixels are generated. So, the number of pixel data obtained from the reference frame is equal to the number of pixels composing the target block. In other words, it is not necessary to obtain pixel data of pixels positioned outside the reference region Sr0. Therefore, the access band width to the frame memory can be reduced without degrading the precision of prediction data obtained from the image data of the reference frame stored in the frame memory.

Especially, even if the filter (tap length) used for performing interpolation on the pixel data in the reference region Sr0 is changed, since the number of pixels obtained from the reference frame as reference pixels is fixed, it is not necessary to change the band width of the memory access.

Further, the amount of arithmetic operations to obtain the pixel values of the interpolation pixels can be reduced by repeatedly using the interpolation pixels inside the reference region Sr0 as interpolation pixels outside the reference region Sr0. For example, when the interpolation pixel 312 inside the reference region Sr0 is used as the interpolation pixel 305 outside the reference region Sr0, arithmetic operations required for generating the pixel value of the interpolation pixel 305 can be reduced.

Further, in the case where coded image data, which have been obtained by predictive coding of image data in the conventional motion compensation method at the data transmitting end, are subjected to predictive decoding using the motion compensation method of this first embodiment at the receiving end, since only the pixel data (prediction data) at the boundary of the prediction block at the receiving end are different from those at the transmitting end, degradation of quality of reproduced image due to the inequality of the prediction data between the transmitting end and the receiving end, is negligible.

Embodiment 2

Figure 4:
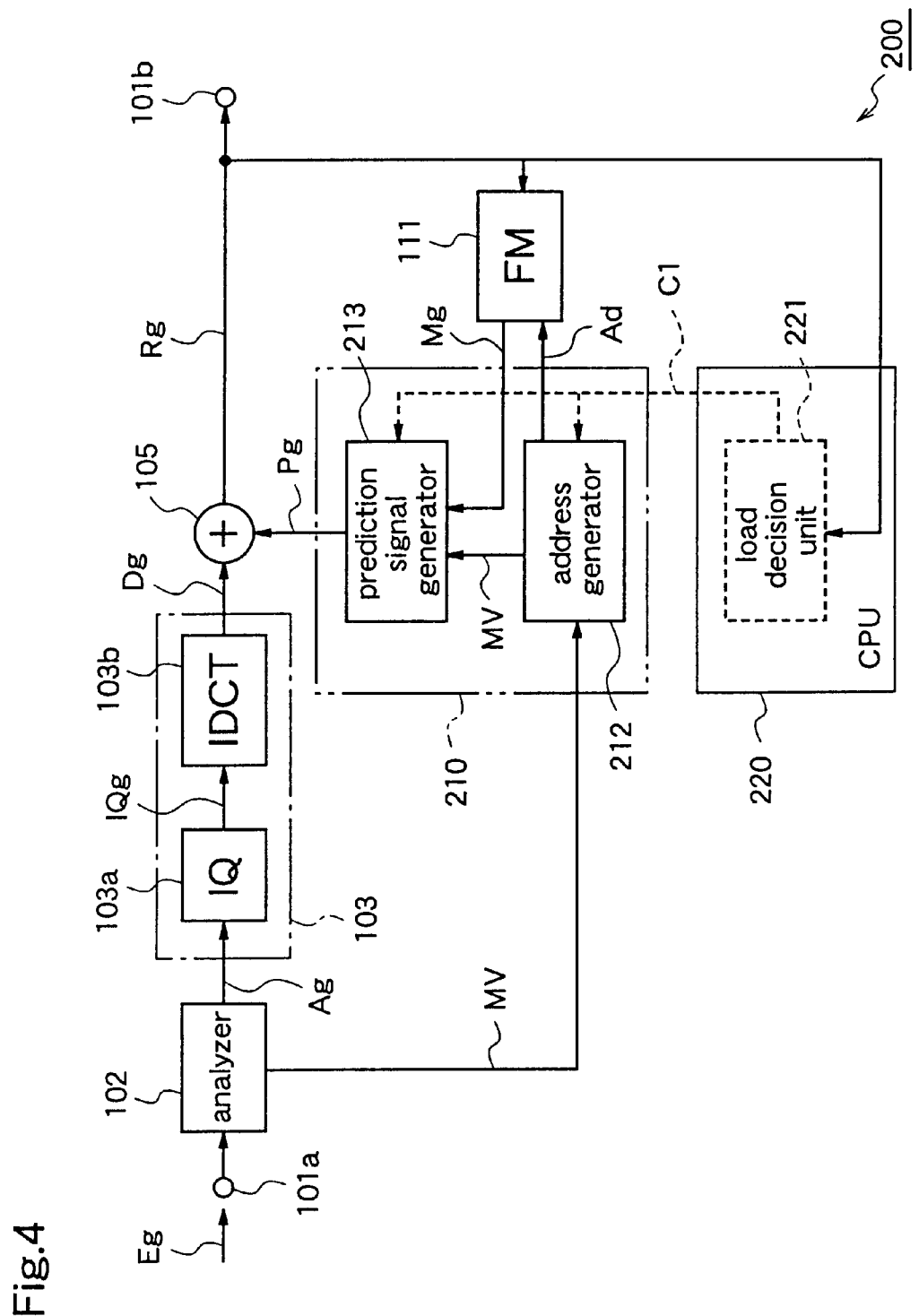
FIG. 4 is a block diagram illustrating an image decoding apparatus as an image processing apparatus according to a second embodiment of the invention.

FIG. 4 is a block diagram illustrating an image decoding apparatus as an image processing apparatus according to a second embodiment of the present invention.

An image decoding apparatus 200 of this second embodiment includes an analyzer 102 which analyzes coded image data of a macroblock (target block) to be decoded; a decoder 103 which decompresses the output (compressed data) Ag from the analyzer 120; and an adder 105 which adds pixel data of a decompressed block to pixel data of a prediction block to generate reproduced data Dg of the target block (i.e., pixel data of a reproduced block). The analyzer 102, the decoder 103, and the adder 105 are identical in structure to those already described with respect to the image decoding apparatus 100 of the first embodiment.

Further, the image decoding apparatus 200 includes a prediction unit 210 which generates prediction data Pg for the target block (i.e., pixel data of a prediction block) according to the reproduced data Rg and the motion vector MV of the target block; and a frame memory 111 which stores the pixel data of the reproduced block for a predetermined number of frames, like the image decoding apparatus 100 of the first embodiment. The prediction unit 210 comprises an address generator 212 which generates an access address Ad for reading pixel data Mg from the frame memory 111 in accordance with the motion vector MV of the target macroblock; and a prediction signal generator 213 which receives the pixel data Mg read from the frame memory 111 and generates the prediction data Pg for the target block in accordance with the motion vector MV.

In this second embodiment, the image decoding apparatus 200 includes a CPU (Central Processing Unit) 220 for controlling arithmetic operations in the decoding process, and the respective units of the image decoding apparatus 200. The CPU 220 comprises a load decision unit 221 which measures the time required for decoding the image of one frame and decides whether the arithmetic load on the decoding process exceeds a reference load or not, and a control signal C1 according to the result of the decision of the load decision unit 221 is input to the address generator 212 and the prediction signal generator 213.

In this second embodiment, the address generator 212 generates the access address Ad for accessing the frame memory 111, in accordance with not only the motion vector MV but also the control signal C1 from the load decision unit 221. The prediction signal generator 213 generates the pixel data Pg of the prediction block specified by the motion vector having fractional pixel prediction, in accordance with the motion vector MV and the control signal C1.

To be specific, in the prediction unit 210, when the result of the load decision is that the arithmetic load exceeds the predetermined reference value, a first data-generation process is carried out, wherein pixel data of the prediction block specified by the motion vector of fractional pixel precision are generated according to pixel data of K×K pixels included in the reference region Sr0 of the reference frame (refer to FIG. 2), the region Sr0 having the same size as the target block. On the other hand, when the arithmetic load does not exceed the reference value, a second data-generation process is carried out, wherein pixel data of the prediction block are generated according to pixel data of K'×K' pixels positioned inside the reference region Sr of the reference frame SF (refer to FIG. 12(c)); the region Sr being larger than the target block. The reference region Sr corresponds to a region (extended reference region) comprising the reference region Sr0 and its peripheral region (the region where the duplicate pixels shown by ● are arranged) in FIG. 2(c).

More specifically, when the arithmetic load on the decoding process exceeds the reference value, the prediction unit 210 performs the first data-generation process as follows. That is, the address generator 212 generates an access address Ad to obtain only the pixel data of K×K pixels included in the reference region Sr0 of the same size as the target block, in accordance with the control signal C1 from the load decision unit 221, by using the integer parts of the values of the motion vector having fractional pixel precision. Thereby, the prediction signal generator 213 obtains only the pixel data of K×K pixels included in the reference region Sr0. At this time, the prediction signal generator 213 subjects the K×K pieces of pixel data so obtained to interpolation by using the fraction parts of the values of the motion vector having fractional pixel precision, thereby generating pixel data of the prediction block specified by the motion vector of fractional pixel precision.

On the other hand, when the arithmetic load does not exceed the reference value, the prediction unit 210 performs the second data-generation process as follows. That is, the address generator 212 generates an access address Ad to obtain only the pixel data of K'×K' pixels included in the extended reference region (reference region Sr shown in FIG. 12(c)) existing in the reference frame SF, by using the integer parts of the values of the motion vector having fractional pixel precision. Thereby, the prediction signal generator 213 obtains only the pixel data of K'×K' pixels included in the reference region Sr. At this time, the prediction signal generator 213 subjects the K'×K' pieces of pixel data so obtained to interpolation by using the fraction parts of the values of the motion vector having fractional pixel precision, thereby generating pixel data of the prediction block specified by the motion vector of fractional pixel precision.

The pixel number K' defining the vertical and horizontal size of the extended reference region is a function a pixel number required to generate on interpolation pixel (i.e., the tap number of a filter used for interpolation). When K=8 and the tap number is 2, K'=9.

Hereinafter, a description is given of the operation.

Figure 5:
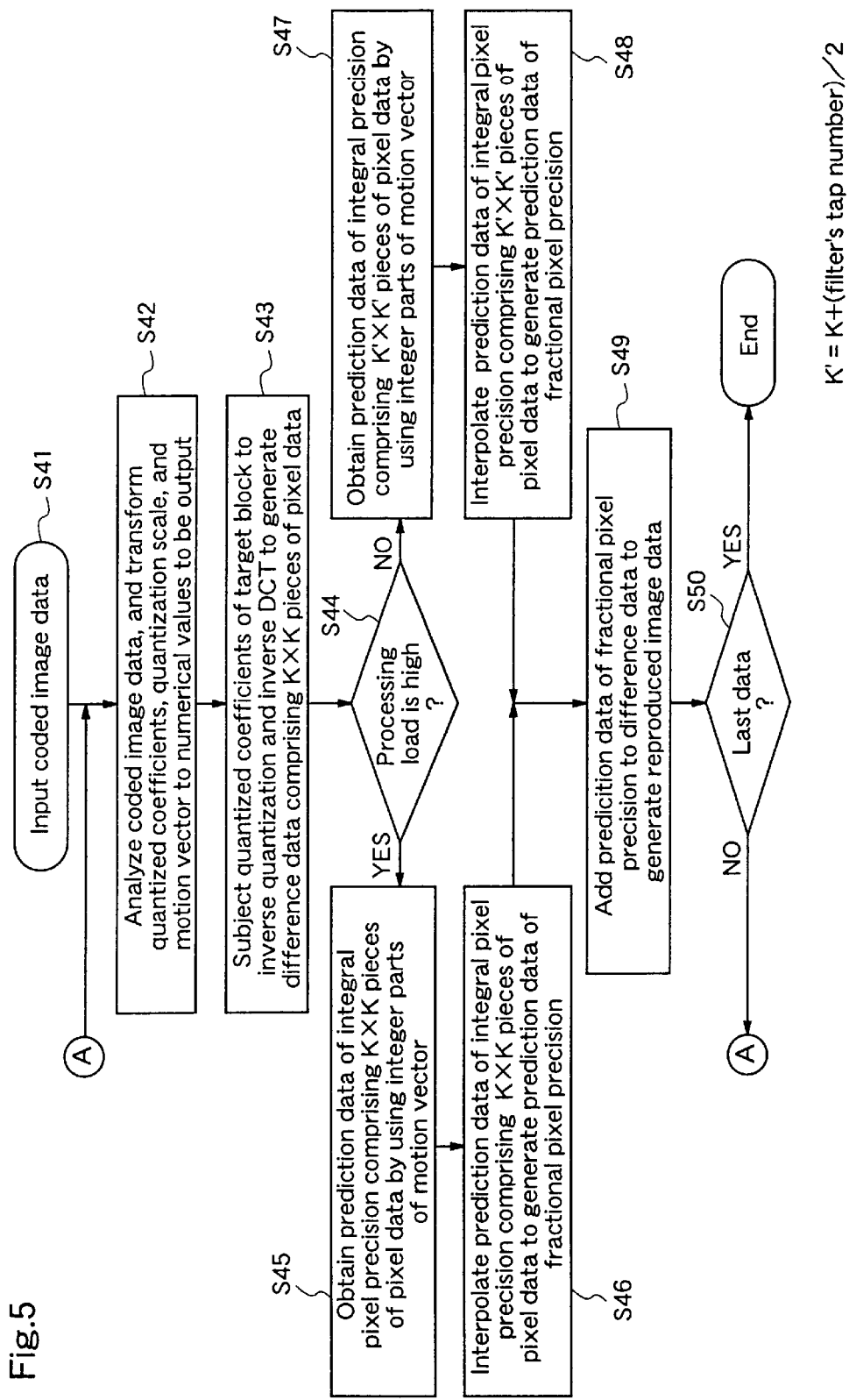
FIG. 5 is a flowchart for explaining predictive decoding by the image decoding apparatus of the second embodiment.

FIG. 5 is a flowchart for explaining a predictive decoding process by the image decoding apparatus of this second embodiment.

The operation of the image decoding apparatus 200 of this second embodiment is fundamentally identical to that of the image decoding apparatus 100 of the first embodiment, except that the process of the prediction unit 210 is switched between the first data-generation process (motion compensation of the first embodiment) and the second data-generation process (conventional motion compensation) in accordance with the arithmetic load on the decoding process.

To be specific, when using only K×K pieces of reference pixels in accordance with the motion vector of 0.5 pixel precision, the first data-generation process is carried out. When K'×K' (K'>K) pieces of reference pixels are obtained in accordance with the motion vector of 0.5 pixel precision, the second data-generation process is carried out. Further, in the load decision unit (load measuring unit) 221, when detecting the arithmetic load, the time required for decoding one image (frame) is measured, and the first data-generation process is carried out when the measured decoding time exceeds a predetermined threshold, while the second data-generation process is carried out when the decoding time does not exceed the threshold.

In other words, the relatively simple first data-generation process (motion compensation of the first embodiment) is carried out when the arithmetic load is high, while the second data-generation process (conventional motion compensation) is carried out when the arithmetic load is low. The threshold depends on the time required for image display. For example, when displaying 30 images (frames) per second, the decoding time of coded image data of one frame should be shorter than 1/30 sec. Accordingly, the threshold is 1/30×0.8 sec in this case.

Although the decision of the arithmetic load is based on the decoding time, it may be based on the access frequency to the frame memory. Further, the decision may be based on the access band width to the frame memory (the bit number when performing parallel access in which plural bits are simultaneously accessed to the frame memory). In this case, switching between the first and second data-generation processes is made according to whether the band width exceeds a set band width or not. Moreover, the decision may be based on the kind of the coded image data. For example, assuming that the coded image data has an identifier as to whether overlap motion compensation should be carried out or not, when it is recognized from the identifier that overlap motion compensation should be carried out, the relatively simple first data-generation process is carried out. When it is recognized from the identifier that overlap motion compensation is not needed, the second data-generation process, which is preferable for maintaining high image quality, is performed. Alternatively, switching between the first and second data-generation processes may be made according to whether the input coded image data includes shape data or not. To be specific, when the input coded image data has been obtained by coding an arbitrary shape image signal including a shape signal and a texture signal, the first data-generation process of less amount of arithmetic operation is performed. On the other hand, when the input coded image data has been obtained by coding an image signal including no shape signal, the second data-generation process, which is preferably for maintaining high image quality, is performed.

Hereinafter, the operation of the image decoding apparatus 200 of this second embodiment will be described in more detail, along the flowchart of FIG. 5.

First of all, when coded image data, which has been obtained by compressively coding image data by MPEG1 or the like, is input to the image decoding apparatus 200 (step S41), the coded image data is analyzed in the analyzer 102 to be separated into quantized DCT coefficients (quantized coefficients), a quantization width, and a motion vector, and the values of these image data are transformed from the corresponding coded data to the corresponding numerical data to be output (step S42).

Next, in the decoder 103, the inverse quantizer 103a subjects the quantized coefficients of the target block to inverse quantization in units of K×K pixels to generate restored DCT coefficients IQg and, further, the inverse DCT unit 103b subjects the restored DCT coefficients IQg to inverse DCT, thereby generating restored data (difference data) Dg comprising K×K pieces of pixel data (step S43).

Next, in the load decision unit 221 of the CPU 220, it is decided whether the arithmetic load on the decoding process exceeds a predetermined threshold or not, by using the above-described load decision method (step S44). According to the result of the decision, the method for generating prediction data from pixel data of the reference frame by motion compensation is decided.

That is, when the arithmetic load exceeds the threshold, the same processes as those in steps S24 and S25 of the first embodiment are performed in steps S45 and S46, respectively, to generate prediction data for the target block. On the other hand, when the arithmetic load does not exceed the threshold, the same processes as those in steps S74 and S75 of the conventional motion compensation are performed in steps S47 and S48, respectively, to generate prediction data for the target block.

Then, in the adder 105, the prediction data so generated are added to the restored data (difference data), thereby generating reproduced data Rg of the target block (step S49).

Thereafter, it is decided whether or not the target block is the last block in the last frame among the frames constituting the image (step S50). When the target block is not the last block, the processes in steps S41~S50 are carried out again. When the target block is the last block, the decoding process is ended.

As described above, according to the second embodiment of the invention, the arithmetic load on the decoding process is measured, and when the arithmetic load is high, pixel data of 0.5 pixel precision corresponding to the prediction block are obtained by interpolation using only pixel data of K×K pixels positioned inside the reference region Sr0 of the same size as the target block. When the arithmetic load is low, pixel data of 0.5 pixel precision corresponding to the prediction block are obtained by interpolation using pixel data of K'K' pixels (K'=K+(filter's tap length)/2) positioned inside the reference region Sr0 and in the vicinity of the region Sr0. Therefore, when the arithmetic load is low, images can be reproduce with the best quality assured. Moreover, when the arithmetic load is high, unwanted interruption of decoding is avoided without degrading the image quality, whereby images of smooth motion can be reproduced.

[Embodiment 3]

Figure 6:
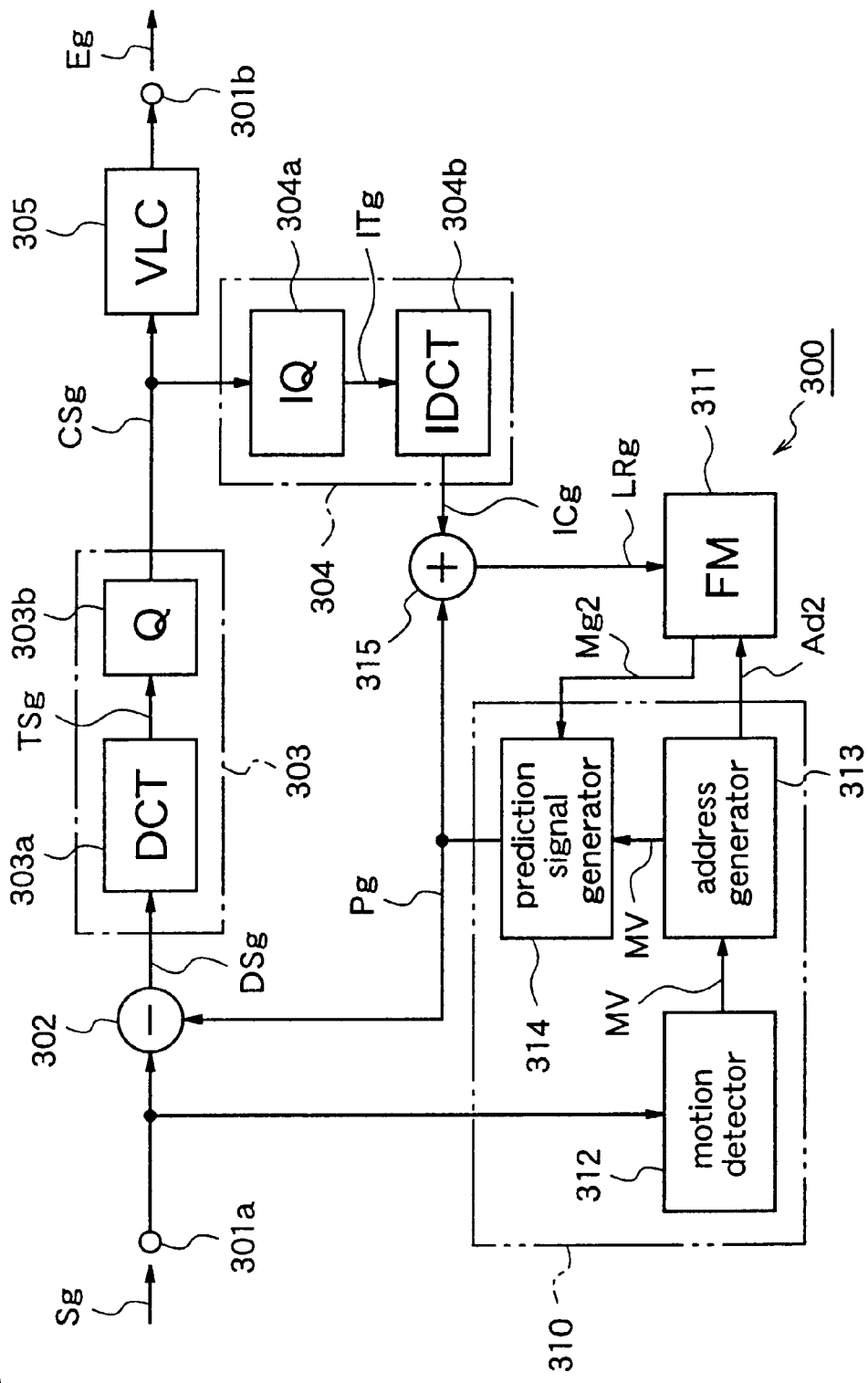
FIG. 6 is a block diagram illustrating an image coding apparatus as an image processing apparatus according to a third embodiment of the invention.

FIG. 6 is a block diagram illustrating an image coding apparatus as an image processing apparatus according to a third embodiment of the present invention.

The image coding apparatus 300 performs a coding process in which image data comprising pixel data of plural pixels are compressively coded in block units each comprising K×K pixels, for each frame comprising plural blocks, to generate coded image data corresponding to each frame.

The image coding apparatus 300 comprises a subtracter 302 which subtracts prediction data Pg (pixel data of a prediction block) from image data Sg of a target block to be coded to generate difference data DSg of the target block; a data compressor 303 which compresses the difference data DSg of the target block to generate compressed data CSg of the target block; and a variable-length coder (VLC) 305 which subjects the compressed data CSg to variable-length coding. The data compressor 303 comprises a DCT unit 303a which subjects the difference data DSg to DCT (i.e., transformation of space-domain data to frequency-domain data) to generate DCT coefficients TSg; and a quantizer 303b which quantizes the DCT coefficients TSg to generate quantized coefficients (compressed data) CSg.

The image coding apparatus 300 further includes a data decompressor 304 which decompresses the compressed data CSg of the target block to generate restored difference ICg of the target block; and an adder 315 which adds the restored difference data ICg of the target block and its prediction data Pg to generate locally reproduced data LRg of the target block. The data decompressor 304 comprises an inverse quantizer (IQ) 304a which inversely quantizes the quantized coefficients (compressed data) to generate restored DCT coefficients ITg; and an inverse DCT unit (IDCT) 304b which subjects the restored DCT coefficients ITg to inverse DCT (i.e., transformation from frequency-domain data to space-domain data) to generate restored difference data ICg.

Further, the image coding apparatus 300 includes a frame memory 311 which stores the locally reproduced data LRg of desired frames; and a prediction unit 310 which calculates pixel data Pg of a prediction block as prediction values for the pixel data of the target block, from the locally reproduced data of a reference frame stored in the frame memory 311, in accordance with the motion vector MV of the target block.

The prediction unit 310 comprises a motion detector 312 which detects the motion vector MV of the target block, according to the image data applied to the input terminal 301a; an address generator 313 which generates an access address Ad2 for reading reference data Mg from the frame memory 311, according to the motion vector MV of the target block; and a prediction signal generator 314 which receives the reference data Mg read from the frame memory 311 and generates the prediction data Pg (pixel data of the prediction block) for the target block, according to the motion vector MV. The prediction unit 310 is constructed so as to generate pixel data of a prediction block specified by the motion vector having fractional pixel precision, according to pixel data of only K×K pixels included in a reference region having the same size as the target block.

A description is now given of the operation.

Figure 7:
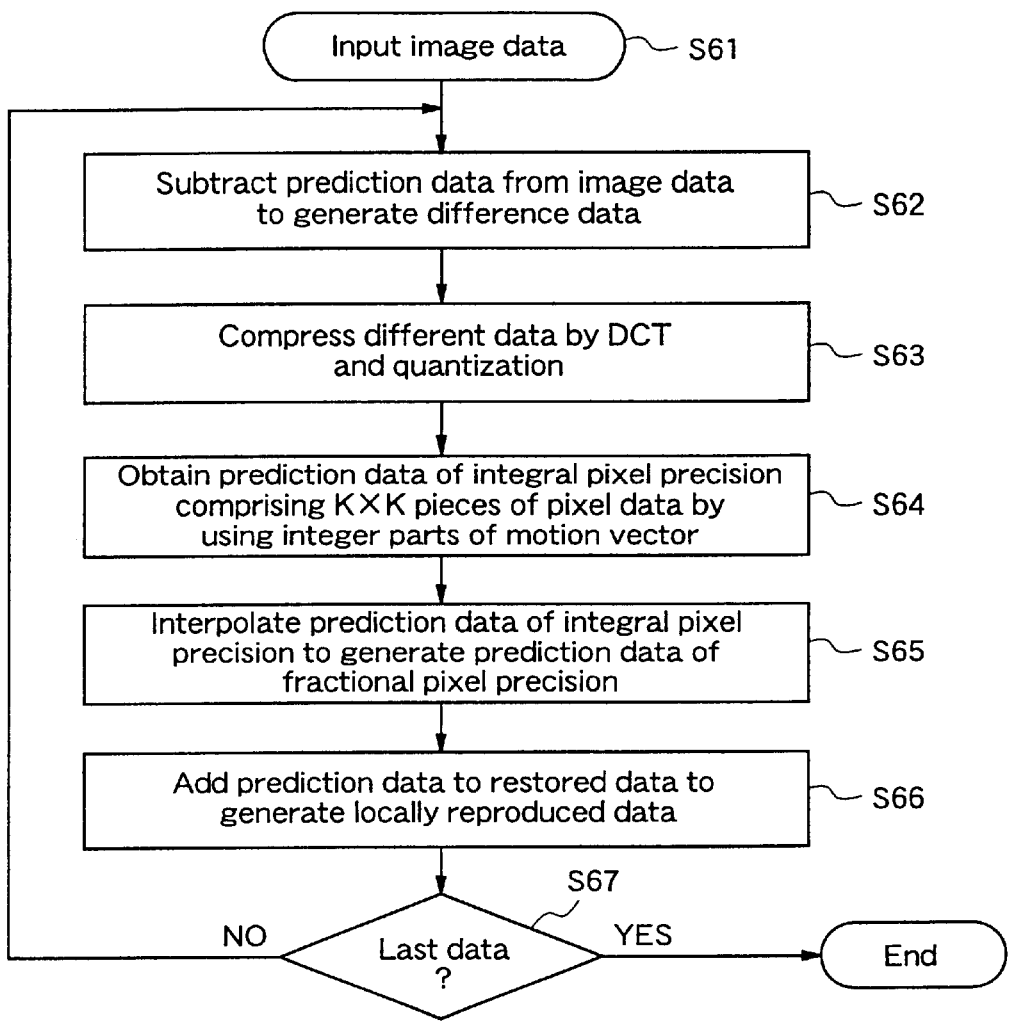
FIG. 7 is a flowchart for explaining predictive coding by the image coding apparatus of the third embodiment.

FIG. 7 is a flowchart for explaining a predictive coding process by the image coding apparatus of this third embodiment.

When the image data Sg is input to the image coding apparatus 300 (step S61), the subtracter 302 calculates a difference between a macroblock to be coded (target block) and prediction data (pixel data of a prediction block) as prediction values for image data of the target block, to generate difference data DSg (step S62). The difference data DSg is transformed to compressed data CSq in the data compressor 303 (step S63). To be specific, the difference data DSg is subjected to DCT in the DCT unit 303a to be transformed to DCT coefficients TSg, and the DCT coefficients TSg are quantized in the quantizer 303b to be transformed to quantized coefficients (compressed data) CSg. The compressed data CSg is subjected to variable-length coding in the variable-length coder 305, and output as coded image data Eg to be transmitted or recorded.

Further, the compressed data CSg is decompressed by the data decompressor 304 to be transformed to restored difference data ICg. That is, the quantized coefficients (compressed data) CSg are subjected to inverse quantization by the inverse quantizer 304a to be transformed to restored DCT coefficients ITg and, further, the restored DCT coefficients ITg are subjected to inverse DCT (transformation from frequency-domain data to space-domain data) by the inverse DCT unit 304b to be transformed to restored difference data ICg.

In the state where coding of the image data corresponding to the target block is being carried out, prediction data for the target block (pixel data of a prediction block) are generated in the prediction unit 310 (steps S64 and S65).

Steps S64 and S65 will be described in more detail. In the motion detector 312, the motion vector MV of the target block is detected according to the image data Sg of the target block applied to the input terminal 301a, and the locally reproduced data LRg of a reference frame (a frame which has been coded previously to the target frame) stored in the frame memory. In the address generator 313, an access address Ad2 for accessing the frame memory 311 is generated according to the motion vector MV, and pixel data of a reference region (a region of the same size as the target block) specified by the motion vector MV are read from the frame memory 311 to the prediction data generator 314, in accordance with the access address Ad2. In the prediction data generator 314, pixel data Pg or a prediction block specified by the motion vector MV of fractional pixel precision are generated according to the pixel data Mg2 read from the frame memory 311.

In this third embodiment, when generating prediction data having ½ pixel precision (fractional pixel precision) in both of the vertical and horizontal directions, K×K pieces of reference data in the reference region Sr0 of the same size as the target block (refer to FIGS. 2(b) and 2(c)) are obtained in the prediction signal generator 314, with a position in the reference frame as a reference point, the position being specified by the integer parts of the values of the motion vector (step S64).

In the prediction signal generator 314, the K×K pieces of pixel data so obtained are subjected to the interpolation described for the first embodiment to generate prediction data of ½ precision (fractional pixel precision) (step S65).

Further, in the adder 315, the restored difference data Icq of the target block and the prediction data Pg are summed up to generate locally reproduced data Lrg of the target block (step S66). The locally reproduced data LRg are stored in the frame memory 311.

Finally, it is decided whether or not the image data of the target block corresponds to the last block in the last frame among the frames constituting the image (step S67). When the image data does not correspond to the last block, the processes in steps S61~S67 are carried out again. When the image data corresponds to the last block, the coding process is ended.

As described above, according to the third embodiment of the invention, in predictive coding of image data, when generating prediction data (pixel data of a prediction block) with fractional pixel precision, only pixels within a reference region of a reference frame, the region having the same size as a target block to be coded, are used as reference pixels, and pixel data of interpolation pixels positioned among these reference pixels are generated. Therefore, the number of pixel data obtained from the reference frame is equal to the number of pixels composing the target block. In other words, it is not necessary to obtain pixel data of pixels positioned outside the reference region. Consequently, the access band width to the frame memory can be reduced without degrading the precision of prediction data in the coding process.

Further, the image data coded by the image coding apparatus according to this third embodiment can be correctly decoded by using the image decoding apparatus according to the first embodiment.

[Embodiment 4]

Figure 8:
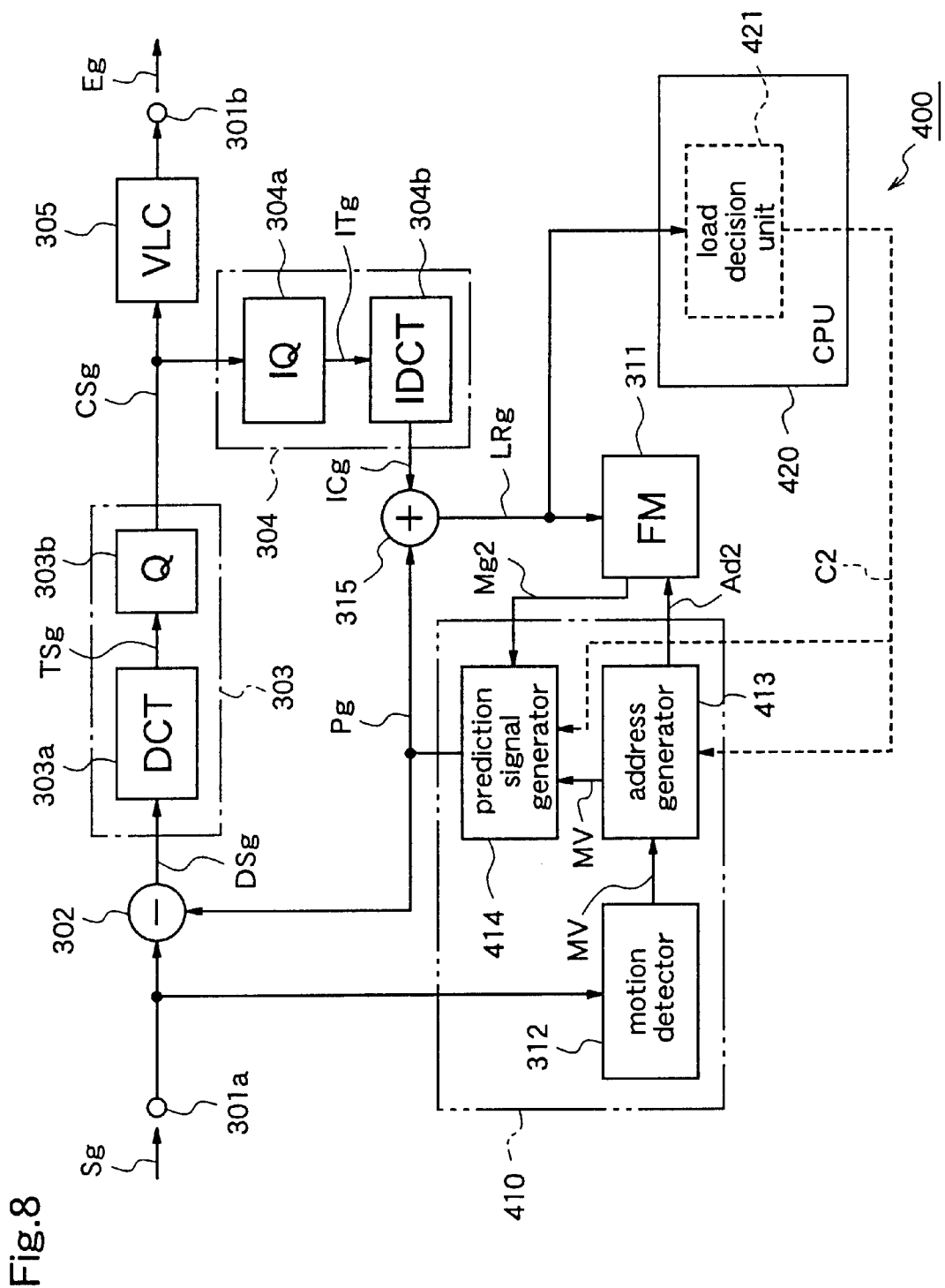
FIG. 8 is a block diagram illustrating an image coding apparatus as an image processing apparatus according to a fourth embodiment of the invention.

FIG. 8 is a block diagram illustrating an image coding apparatus as an image processing apparatus according to a fourth embodiment of the present invention.

The image coding apparatus 400 of this fourth embodiment includes a subtracter 302 which obtains difference data DSg between image data of a target macroblock to be coded and its prediction data; a data compressor 303 which compresses the difference data Dsg (the output Ag of the subtracter 302) to generate compressed data CSg; a variable-length coder 305 which subject the compressed data CSg to variable-length coding; a data decompressor 304 which decompresses the compressed data CSg of the target block to generate decompressed data ICg (restored difference data) of the target block; and an adder 315 which adds the restored difference data ICg of the target block and prediction data Pg for the target block to generate locally reproduced data LRg of the target block.

Furthermore, the image coding apparatus 400 includes a frame memory 311 which stores the locally reproduced data LRg corresponding to desired frames; and a prediction unit which calculates pixel data of a prediction block as prediction values for the pixel data of the target block, from the locally reproduced data of a reference frame stored in the frame memory 311, in accordance with the motion vector Mv of the target block.

The image coding apparatus 400 further includes a CPU 420 which controls arithmetic operations in the coding process and the respective units of the apparatus 400. The CPU 420 comprises a load decision unit 421 which measures the time required for local decoding of one frame image and decides whether the arithmetic load on the coding process exceeds a reference load (threshold) or not, and a control signal C2 according to the result of the decision of the load decision unit 421 is output to an address generator 413 and a prediction signal generator 414 which are constituents of the prediction unit 410.

In this fourth embodiment, the address generator 413 generates an access address Ad for accessing the frame memory 311, based on not only the motion vector MV but also the control signal C2 from the load decision unit 421, and the prediction signal generator 414 generates prediction data Pg (pixel data of a prediction block) specified by the motion vector having fractional pixel prediction, in accordance with the motion vector MV and the control signal C2.

To be specific, in the prediction unit 410, when the result of the load decision by the load decision unit 421 is that the arithmetic load exceeds the reference value, a first data-generation process is carried out, wherein pixel data Pg of the prediction block specified by the motion vector of fractional pixel precision are generated according to pixel data of K×K pixels included in a reference region of the reference frame, the region having the same size as the target block. On the other hand, when the arithmetic load does not exceed the reference value, a second data-generation process is carried out, wherein pixel data of the prediction block are generated according to pixel data of K'×K' pixels positioned inside a reference region Sr of the reference frame SF (refer to FIG. 12(c)), the region Sr being larger than the target block. The reference region Sr corresponds to a region (extended reference region) comprising the reference region Sr0 and its peripheral region (the region where the duplicate pixels shown by ● are arranged) in FIG. 2(c).

More specifically, when the arithmetic load on the coding process exceeds the reference value, the prediction unit 410 performs the first data-generation process as follows. That is, the address generator 413 generates an access address Ad2 to obtain only the pixel data of K×K pixels included in the reference region Sr0 of the same size as the target block, in accordance with the control signal C2 from the load decision unit 421, by using the integer parts of the values of the motion vector having fractional pixel precision. Thereby, the prediction signal generator 414 obtains only the pixel data of K×K pixels included in the reference region Sr0. At this time, in the prediction signal generator 414, the K×K pieces of pixel data so obtained are subjected to interpolation by using the fraction parts of the values of the motion vector having fractional pixel precision, thereby generating pixel data of the prediction block specified by the motion vector of fractional pixel precision.

On the other hand, when the arithmetic load does not exceed the reference value, the prediction unit 410 performs the second data-generation process as follows. That is, the address generator 413 generates an access address Ad2 to obtain only the pixel data of K'×K' pixels included in the extended reference region (reference region Sr shown in FIG. 12(c)) existing in the reference frame SF, by using the integer parts of the values of the motion vector having fractional pixel precision. Thereby, the prediction signal generator 414 obtains only the pixel data of K'×K' pixels included in the reference region Sr. At this time, in the prediction signal generator 414, the K'×K' pieces of pixel data so obtained are subjected to interpolation by using the fraction parts of the values of the motion vector having fractional pixel precision, thereby generating pixel data of the prediction block specified by the motion vector of fractional pixel precision.

The pixel number K' defining the vertical and horizontal size of the extended reference region is a function of pixel number required for generating one interpolation pixel (i.e., the tap number of a filter used for interpolation). When K=8 and the tap number is 2, K'=9.

Hereinafter, the operation of the image coding apparatus 400 will be described.

Figure 9:
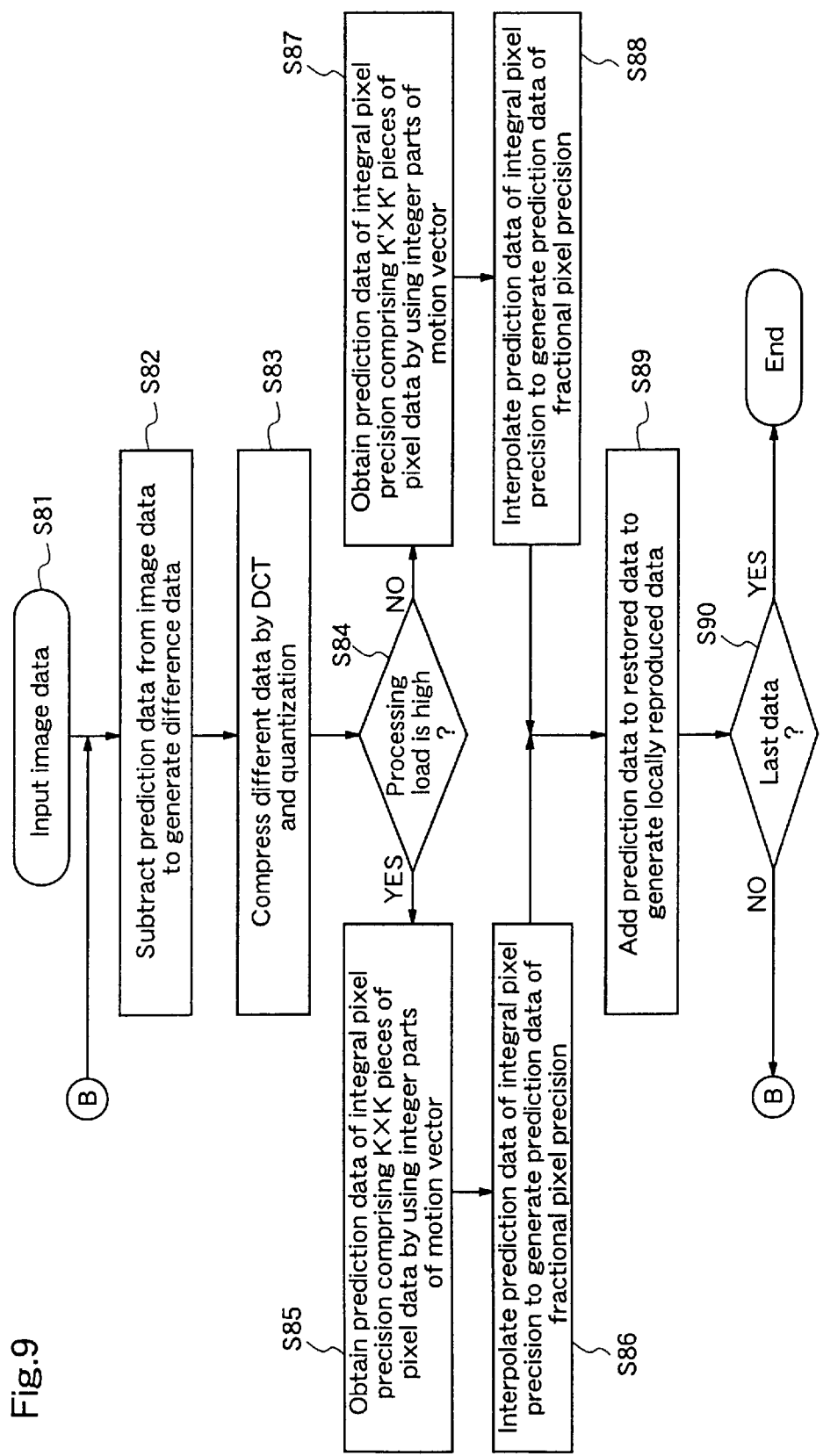
FIG. 9 is a flowchart for explaining predictive coding by the image coding apparatus of the fourth embodiment.

FIG. 9 is a flowchart for explaining a predictive coding process by the image coding apparatus of this fourth embodiment.

When image data Sg is input to the image coding apparatus 400 (step S81), the subtractor 302 calculates a difference between the image data of a macroblock to be coded (target block) and its prediction data, thereby generating difference data DSg (step S82). The difference data DSg is transformed to compressed data CSg in the data compressor 303 (step S83). The compressed data Csg is subjected to variable-length coding the variable-length coder 305, and output as coded image data Eg to be transmitted or recorded.

Next, in the load decision unit 421 of the CPU 42, it is decided whether the arithmetic load on the coding process exceeds a predetermined threshold or not. As for the method of deciding the arithmetic load, an appropriate one is selected from the decision methods described for the second embodiment. Then, according to the result of the decision, the method for generation prediction data from the pixel data of the reference frame by motion compensation is decided (step S84).

When the arithmetic load exceeds the threshold, the same processes as those in steps S64 and S65 according to the third embodiment are carried out in steps S85 and S86, respectively, to generate prediction data for the target block. On the other hand, when the arithmetic load does not exceed the threshold, the same processes as those in steps S74 and S75 (conventional motion compensation shown in FIG. 12) are carried out in steps S87 and S88, respectively, to generate prediction data of the target block.

In the adder 315, the prediction data Pg so generated are added to the restored difference data ICg to generate locally reproduced data LRg of the target block (step S89).

Thereafter, it is decided whether or not the image data of the input target block corresponds to the last block in the last frame among the frames constituting the image (step S90). When the image data does not correspond to the last block, the processes in steps S81–S90 are carried out again. When the image data corresponds to the last block, the predictive code process is ended.

As described above, according to the fourth embodiment of the invention, the arithmetic load is measured in the coding process. When the arithmetic load is high, the pixel data of 0.5 pixel precision corresponding to the prediction block are obtained by interpolation using only pixel data of K×K pixels positioned inside the reference region SrO of the same size as the target block (refer to FIG. 2). When the arithmetic load is low, pixel data of 0.5 pixel precision corresponding to the prediction block are obtained by interpolation using pixel data of K'=K' pixels (K'–K+(filter's tap length )/2) positioned inside and in the vicinity of the reference region SrO. Therefore, when the arithmetic load is low, the image data can be coded while maintaining the highest image quality. Moreover, when the arithmetic load is high, coding is satisfactorily carried out without degrading the image quality.

[Embodiment 5]

Figure 10:
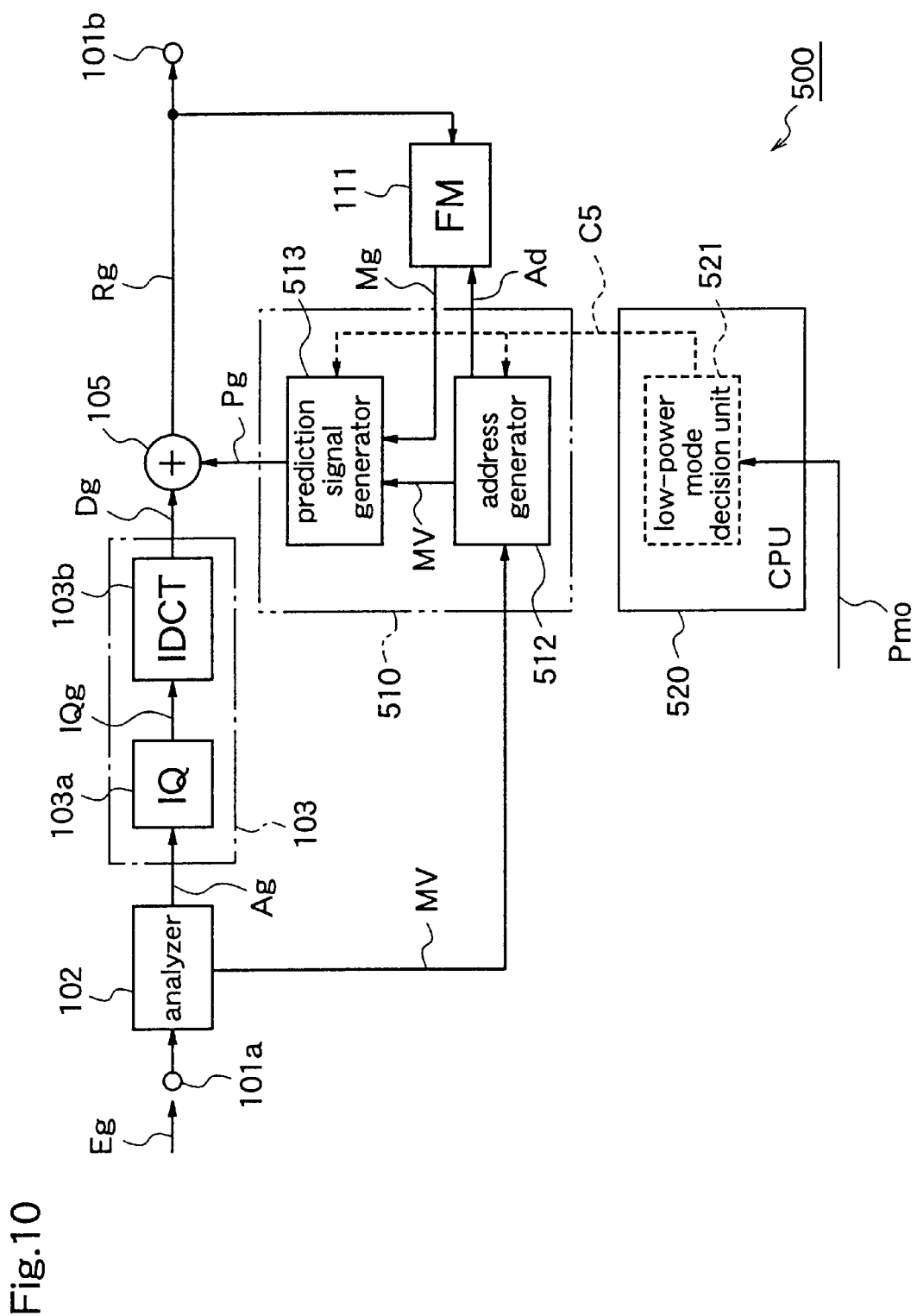
FIG. 10 is a block diagram illustrating an image decoding apparatus as an image processing apparatus according to a fifth embodiment of the invention.

FIG. 10 is a block diagram illustrating an image decoding apparatus as an image processing apparatus according to a fifth embodiment of the present invention.

An image decoding apparatus of this fifth embodiment is able to switch the operation mode in the decoding process between a normal operation mode and a low-power operation mode (low power consumption mode), according to an operation mode switching signal Pmo generated by manual operation.

The image decoding apparatus 500 includes a control unit (hereinafter referred to as a CPU) 520 which decides whether the operation mode is the low-power operation mode or not in accordance with the mode switching signal Pmo and outputs a control signal C5 corresponding to the result of the decision, in place of the CPU 220 having the load decision unit 221 according to the second embodiment. Other constituents of the CPU 520 are identical to those of the CPU 220 of the second embodiment.

Further, the image decoding apparatus 500 includes a prediction unit 510 which switches generation of image data Pg of a prediction block between the above-described first data-generation process and the second data-generation process in accordance with control signal C5, in place of the prediction unit 210 included in the image decoding apparatus 200 of the second embodiment.

In the prediction unit 510, based on the result of the mode decision, when the operation mode is the low-power operation mode, the first data-generation process is carried out, wherein pixel data of the prediction block specified by the motion vector of fractional pixel precision are generated according to pixel data of only K×K pixel s included in the reference region SrO of the reference frame (refer to FIG. 2), the region SrO having the same size as the target block. On the other hand, when the operation mode is the normal operation mode, the second data-generation process is carried out, wherein pixel data of the prediction block are generated according to pixel data of K'×K' pixels positioned inside the reference region Sr of the reference frame SF (refer to FIG. 12(c)), the region Sr being larger than the target block. The reference region Sr corresponds to a region (extended reference region) comprising the reference region SrO and its peripheral region (the region where the duplicate pixels shown by ● are arranged) in FIG. 2c).

Accordingly, an address generator 512 and a prediction signal generator 513 constituting the prediction unit 510 are identical to the address generator 212 and the prediction signal generator 213 except that the generators 512 and 513 receive the output (control signal) C5 from the low-power mode decision unit 521 while the generators 212 and 213 receive the output (control signal) C2 from the load decision unit 221.

Other constituents of the image decoding apparatus 500 of this fifth embodiment are identical to those of the image decoding apparatus 200 of the second embodiment.

A description is given of the operation.

Figure 11:
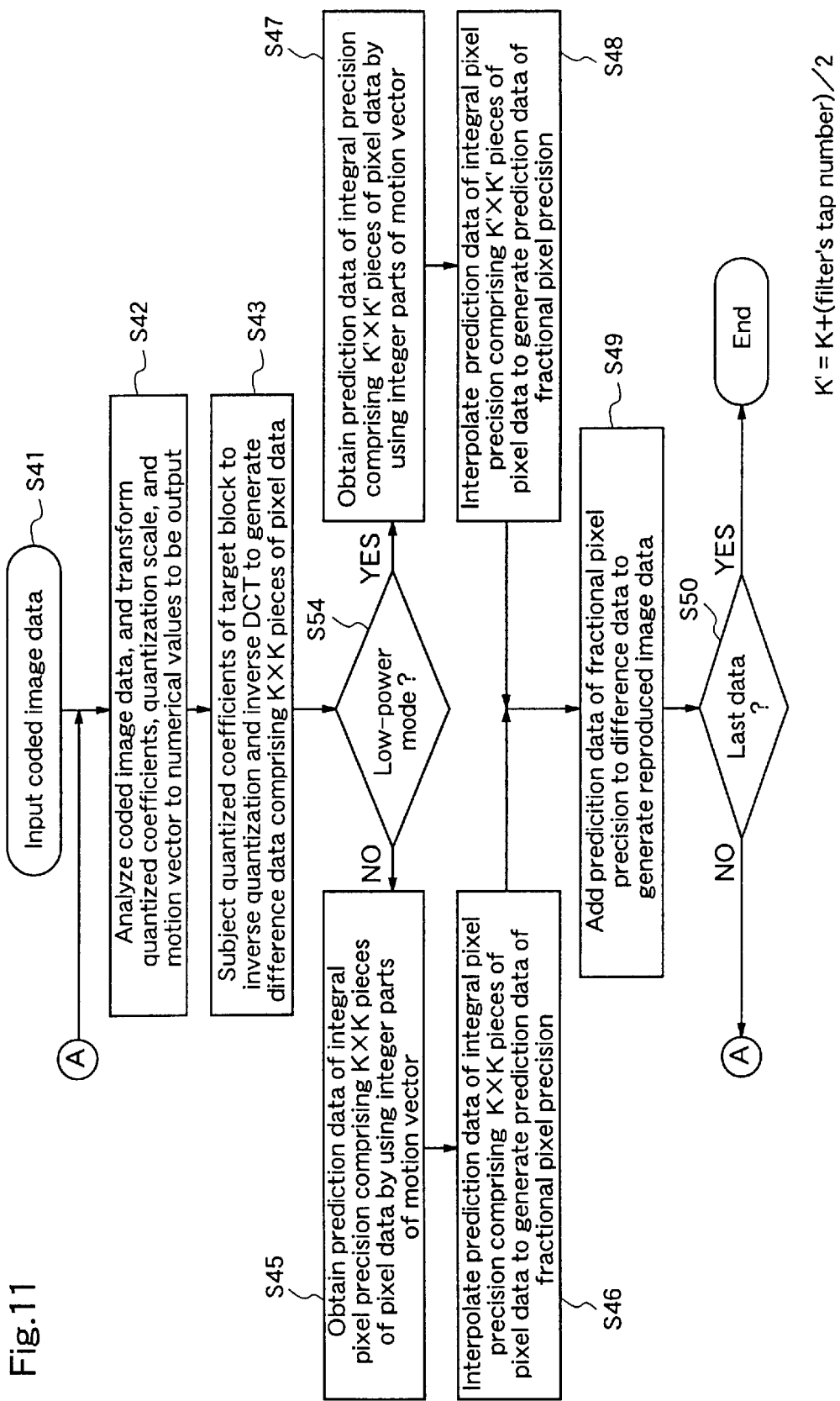
FIG. 11 is a flowchart for explaining predictive decoding by the image decoding apparatus of the fifth embodiment.

FIG. 11 is a flowchart for explaining a predictive decoding process by the image decoding apparatus of this fifth embodiment.

In the image decoding apparatus 200 of the second embodiment, generation of prediction data depends on whether the arithmetic load is larger than a threshold or not. In contrast with the second embodiment, in the image decoding apparatus 500 of this fifth embodiment, the process of the prediction unit 510 is switched between the first data-generation process and the second data-generation process, according to the operation mode of the apparatus corresponding to the mode switching signal Pmo generated by manual operation. Other operations of the image decoding apparatus 500 are identical to those of the image decoding apparatus 200 of the second embodiment.

More specifically, in the image decoding apparatus 500, when the operation mode indicated by the mode switching signal Pmo is the low-power operation mode, the prediction unit 510 performs the first data-generation process. When the operation mode is the normal operation mode, the prediction unit 510 performs the second data-generation process.

Hereinafter, the operation of the image decoding apparatus 500 will be briefly described by using the flowchart of FIG. 11.

Initially, the following steps are carried out in the same manner as already described for the second embodiment: input of coded image data to the apparatus 500 (step S41); transformation of image data, such as DCT coefficients (quantized coefficients), quantization scale, and motion vector, from corresponding coded data to corresponding numerical data (step S42); and inverse quantization and inverse DCT by the decoder 103 (step S43).

Thereafter, in the low-power mode decision unit 521 included in the CPU 520, the operation mode is decided according to the mode switching signal Pmo from the outside (step S54). Based on the result of the mode decision, the method for generating prediction data from the pixel data in the reference frame by motion compensation is decided.

That is, when the operation mode is the low-power operation mode, the same processes as those of steps S24 and S25 of the first embodiment are carried out in steps S45 and S46, whereby prediction data for a target block are generated. On the other hand, when the operation mode is the normal operation mode, the same processes as those of steps S74 and S75 of the prior art are carried out in steps S47 and S48, whereby prediction data of a target block are generated.

Thereafter, in the adder 105, the prediction data so generated and the above-described restored data (difference data) are added to generate reproduced data Rg of the target block (step S49), and it is decided whether or not the target block is the last block in the last frame among the frames constituting the image (step S50).

When the target block is not the last block, the processes of steps S41~43, S54, and S45~S50 are performed again. When the target block is the last block, the decoding process is ended.

In this fifth embodiment of the present invention, when coded image data are decoded in predetermined block units, the prediction process for calculating prediction data for a target block from pixel data of a reference frame is carried out according to the motion vector of the target block. In the prediction process, according to whether the operation mode indicated by the mode switching signal Pmo is the normal operation mode or the low-power operation mode, the process of obtaining the prediction data based on the motion vector of fractional pixel precision is switched between the firs process using only M×N pixels included in the reference region having the same size as the target block and the second process using P×Q (P=integer larger than M, Q=integer larger than M) pixels included in the extended reference region comprising the reference region and its periphery. Therefore, when the operation mode is the normal mode, since the second process to generate prediction data is carried out, images are reproduced with the best quality assured. Further, when the operation mode is the low-power operation mode, since the first process to generate prediction data is carried out, unwanted interruption of decoding is avoided without degrading the image quality, resulting in reproduced images of smooth motion.

While in this fifth embodiment the operation mode in the decoding process is switched between the two modes, i.e., the normal operation mode and the low-power operation mode, in accordance with mode switching signal Pmo generated by manual operation, the operation mode may be switched among three modes in accordance with the mode switching signal Pmo.

In this case, for example, the first operation mode is to perform the second data-generation process in the prediction unit, the second operation mode is to perform the first data-generation process in the prediction unit, and the third operation mode is to perform either the first data-generation process or the second data-generation process in the prediction unit according to whether the arithmetic load exceeds a predetermined reference value or not, like the second embodiment of the invention.

Furthermore, in this fifth embodiment, emphasis has been placed on the image decoding apparatus which includes the CPU 220 having the decision unit 521 for deciding whether the operation mode is the low-power mode or not in accordance with the mode switching signal Pmo generated by manual operation, and the operation mode in the decoding process is switched between the normal operation mode and the low-power operation mode according to the result of the mode decision. However, the switching of the operation mode may be performed automatically according to the type of the power supply.

For example, in a portable image processing apparatus which can be driven by a battery power supply or a general 100V commercial power supply such as an AC adapter, when the power is supplied from the battery power supply, the prediction process performs the first data-generation process. On the other hand, when the power is supplied from the 100V commercial power supply, the prediction unit performs the second data-generation process.

This image processing apparatus is implemented by a CPU including a power supply detection unit which detects whether the power is supplied from the batter power supply or the 100V commercial power supply and, according to the result of the detection (the type of the power supply), supplies either a first mode decision signal corresponding to the low-power operation mode or a second mode decision signal corresponding to the normal operation mode, as a control signal C5, to the prediction unit 510.

Furthermore, in this fifth embodiment, the operation mode in the decoding process is switched between the two mode i.e., the normal operation mode and the low-power operation mode, according to the mode switching signal Pmo generated by manual operation, and the prediction unit performs the first or second data-generation process according to the operation mode. However, such switching of the data generating process in the prediction unit may be performed in a coding process.

For example, the image coding apparatus 400 of the fourth embodiment shown in FIG. 8 may include, in place of the CPU 400 and the prediction unit 304, a CPU having a low-power mode decision unit which decides whether the operation mode is the low power mode or not in accordance with a mode switching signal Pmo generated by manual operation and outputs a control signal corresponding to the result of the decision, and a prediction unit which switched generation of image data of a prediction block between the first data-generation process and the second data-generation process in accordance with the control signal.

[Embodiment 6]

Figure 12:
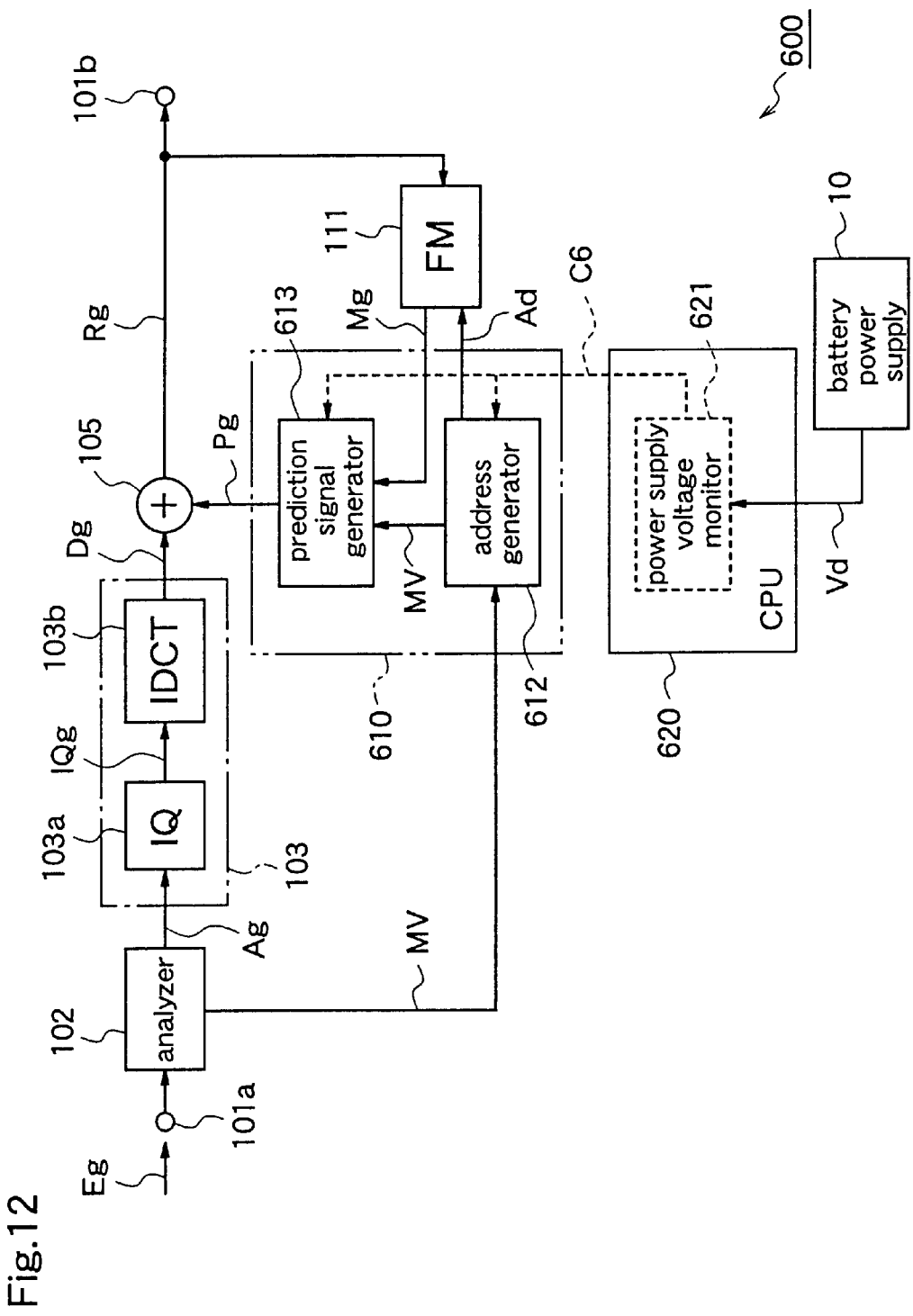
FIG. 12 is a block diagram illustrating an image decoding apparatus as an image processing apparatus according to a sixth embodiment of the invention.

FIG. 12 is a block diagram illustrating an image decoding apparatus as an image processing apparatus according to a sixth embodiment of the present invention.

An image decoding apparatus 800 of this sixth embodiment is driven by the power supplied from a battery power supply 10.

Further, the image decoding apparatus 600 includes a control unit (CPU 620 having a power supply voltage monitor 621 which measures the voltage Vd of the battery power supply 10 and outputs a control signal C6 according to the result of the comparison between the measured voltage and a predetermined reference voltage, in place of the CPU 220 having the load decision unit 221 of the image decoding apparatus 200 according to the second embodiment. Other constituents of the CPU 620 are identical to those of the CPU 220 of the second embodiment.

Further, the image decoding apparatus 600 includes a prediction unit 610 which switched generation of image data Pg if a prediction block between the first data-generation process and the second data-generation process in accordance with the control signal C6, in place of the prediction unit 210 of the image decoding apparatus 200 of the second embodiment.

In the prediction unit 610, when the power supply voltage Vd is lower than the reference voltage, the first data-generation process is carried out, wherein pixel data of the prediction block specified by the motion vector of fractional pixel precision are generated according to pixel data of only K×K pixels included in the reference region Sr0 of the reference frame (refer to FIG. 2), the region Sr0 having the same size as the target block. On the other hand, when the power supply voltage Vd is equal to or higher than the reference voltage, the second data-generation process is carried out, wherein pixel data of the prediction block are generated according to pixel data of K'×K' pixels positioned inside the reference region Sr of the reference frame SF (refer to FIG. 12(*c*)), the region Sr being larger than the target block. The reference region Sr corresponds to a region (extended reference region) comprising the reference region Sr0 and its peripheral region (the region where the duplicate pixels shown by ● are arranged) in FIG. 2(*c*).

Accordingly, an address generator 612 and a prediction signal generator 613 constituting the prediction unit 610 are identical to the address generator 212 and the prediction signal generator 213 except that the generators 612 and 613 receive the output (control signal) C6 from the power supply voltage monitor 621 while the generators 212 and 213 receive the output (control signal) C2 from the load decision unit 221.

Other constituents of the image decoding apparatus 600 of this sixth embodiment are identical to those of the image decoding apparatus 200 of the second embodiment.

A description is given of the operation.

Figure 13:
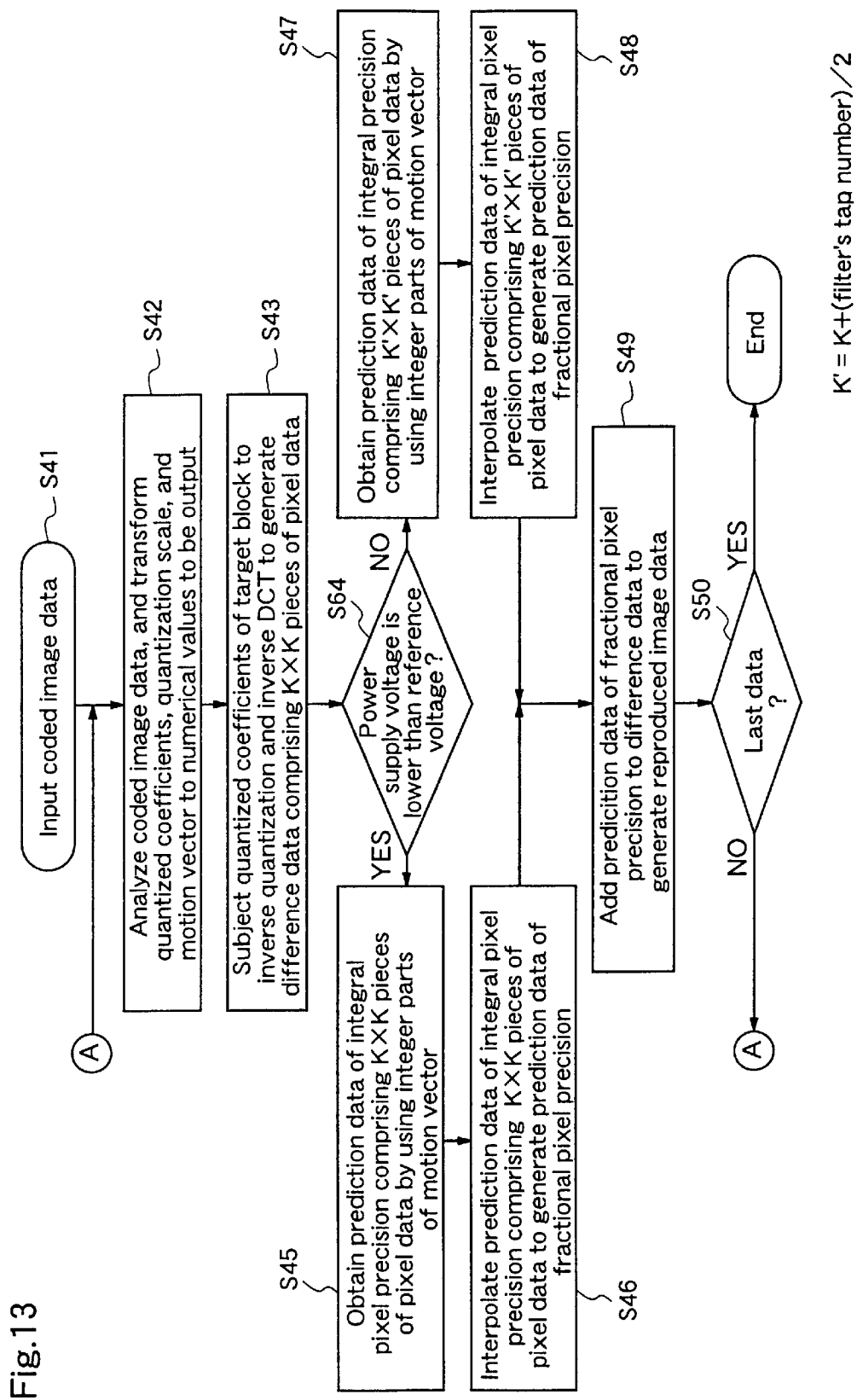
FIG. 13 is a flowchart for explaining predictive decoding by the image decoding apparatus of the sixth embodiment.

FIG. 13 is a flowchart for explaining a predictive decoding process by the image decoding apparatus of this sixth embodiment.

In the image decoding apparatus 200 of the second embodiment, generation of prediction data depends on whether the arithmetic load is larger than a threshold or not.

In contrast with the second embodiment, in the image decoding apparatus 600 of this sixth embodiment, the process of the prediction unit 610 is switched between the first data-generation process and the second data-generation process, according to the result of comparison between the voltage Vd of the battery power supply 10 and the reference voltage. Other operations of the image decoding apparatus 600 are identical to those of the image decoding apparatus 200 of the second embodiment.

More specifically, in the image decoding apparatus 600, when the voltage Vd of the battery power supply 10 is equal to or higher than the reference voltage, the prediction unit 610 performs the first data-generation process. When the voltage Vd is lower than the reference voltage, the prediction unit 610 performs the second data-generation process.

Hereinafter, the operation of the image decoding apparatus 600 will be briefly described by using the flowchart of FIG. 13.

Initially, the following steps are carried out in the same manner as already described for the second embodiment: input of coded image data to the apparatus 600 (step S41); transformation of image data, such as DCT coefficients (quantized coefficients), quantization scale, and motion vector, from corresponding coded data to corresponding numerical data (step S42); and inverse quantization and inverse DCT by the decoder 103 (step S43).

Thereafter, in the power supply voltage monitor 621 of the CPU 620, the voltage Vd of the battery power supply 10 is compared with the reference voltage (step S64). Based on the result of the comparison, the method for generating prediction data from the pixel data of the reference frame by motion compensation is decided.

That is, when the voltage Vd of the battery power supply 10 is lower than the reference voltage, the same processes as those of steps S24 and S25 of the first embodiment are carried out in steps S45 and S46, whereby prediction data for a target block are generated. On the other hand, when the voltage Vd is equal to or higher than the reference voltage, the same processes as those of steps S74 and S75 of the prior art are carried out in steps S47 and S48, whereby prediction data of a target block are generated.

Thereafter, in the adder 105, the prediction data so generated and the above-described restored data (difference data) are added to generate reproduced data Rg of the target block (step S49), and it is decided whether or not the target block is the last block in the last frame among the frames constituting the image (step S50).

When the target block is not the last block, the processes of steps S41~43, S64, and S45~S50 are performed again. When the target block is the last block, the decoding process is ended.

In this sixth embodiment of the present invention, when coded image data are decoded in predetermined block units in the image decoding apparatus driven by the battery power supply, the prediction process for calculating prediction data for a target block from pixel data of a reference frame is carried out according to the motion vector of the target block. In the prediction process, according to the voltage of the battery power supply, the process of obtaining the prediction data according to the motion vector of fractional pixel precision is switched between the first process using only M×N pixels included in the reference region having the same size as the target block, and the second process using P×Q (P=integer larger than M, Q=integer larger than M) pixels included in the extended reference region comprising the reference region and its periphery. Therefore, when the voltage of the battery power supply is sufficiently high, since the first process to generate prediction data is carried out, images are reproduced with the best quality assured. Further, even when the voltage of the battery power supply falls, since the second process to generate prediction data is carried out, unwanted interruption of decoding is avoided without degrading the image quality, resulting in reproduced images of smooth motion.

According to this sixth embodiment, in the image decoding apparatus driven by the battery power supply, the operation mode in the decoding process is switched between the normal operation mode and the low-power operation mode in accordance with the voltage of the battery power supply, and the prediction unit performs either the first data-generation process or the second data-generation process in accordance with the operation mode. However, such switching of the data generating process in the prediction unit may be performed in a coding process.

For example, the image coding apparatus 400 of the fourth embodiment shown in FIG. 8 may include, in place of the CPU 400 and the prediction unit 304, a CPU having a power supply voltage monitor which measures the voltage of a battery power supply of the coding apparatus and outputs a control signal according to whether the measured voltage is lower than a reference voltage or not, and a prediction unit which switches generation of image data of a prediction block between the first data-generation process and the second data-generation process according to the control signal.

When an image coding apparatus, in which generation of prediction data can be switched according to whether the voltage of a battery power supply is larger than a reference voltage or not, is mounted on a camera such as a video camera, it is possible to realize a camera capable of shooting for many hours while saving the battery power.

Embodiment 7

Figure 14:
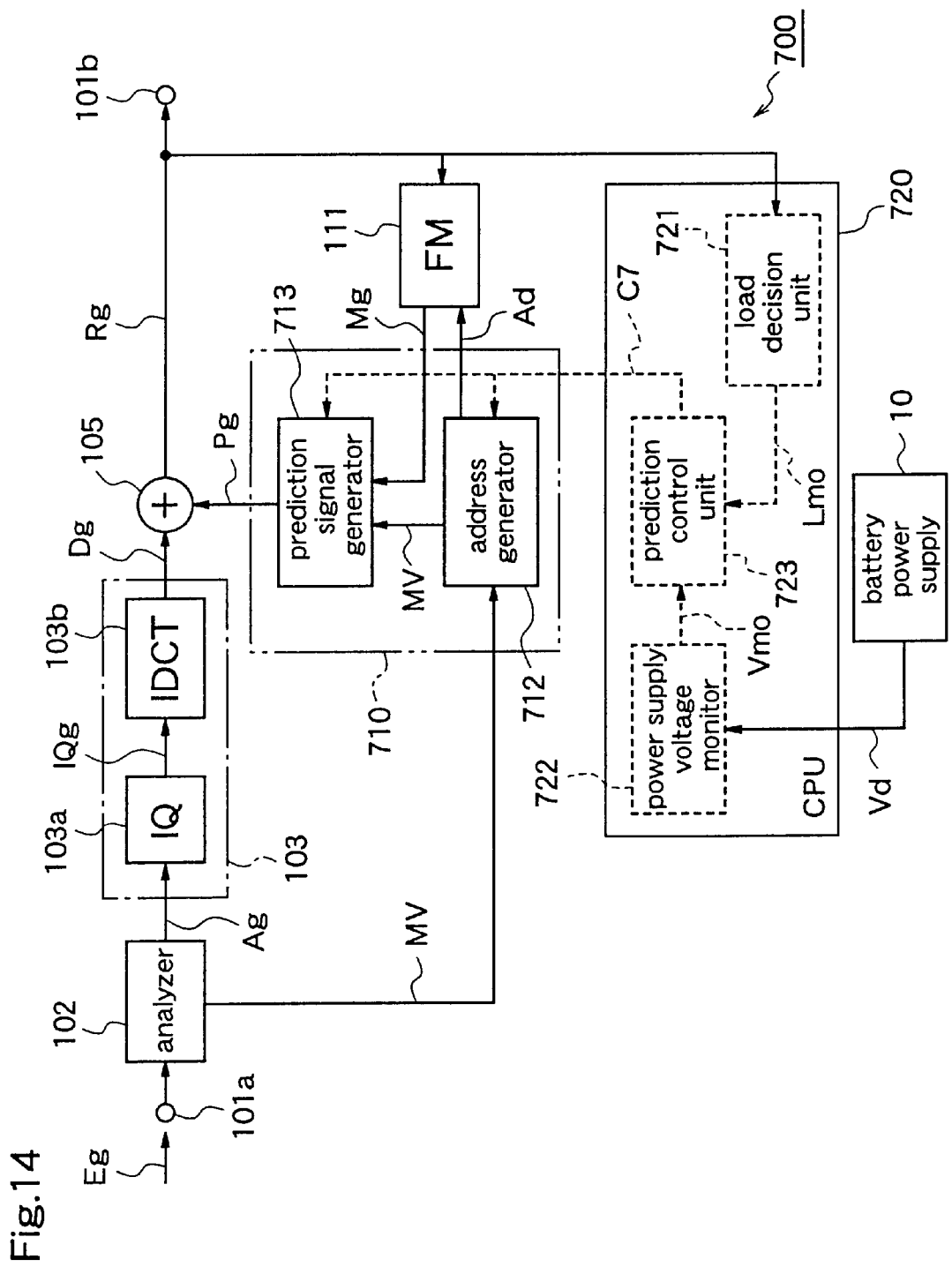
FIG. 14 is a block diagram illustrating an image decoding apparatus as an image processing apparatus according to a seventh embodiment of the invention.

FIG. 14 is a block diagram illustrating an image decoding apparatus as an image processing apparatus according to a seventh embodiment of the present invention.

An image decoding apparatus 700 of this seventh embodiment is driven by the power from a battery power supply 10, like the image decoding apparatus 600 of the sixth embodiment.

Further, the image decoding apparatus 700 includes a control unit (CPU) 720 in place of the CPU 200 having the load decision unit 221 of the image decoding apparatus 200 according to the second embodiment. The CPU 720 includes a power supply voltage monitor 722 which measures the voltage Vd of the battery power supply 10, compares the measured voltage (monitor voltage) with a first reference voltage and a second reference voltage higher than the first reference voltage, and outputs a comparison output Vmo based on the result of the comparison between the measured voltage and the reference voltages; a load decision unit 721 which measures the time required for decoding an image of one frame to decide whether the arithmetic load on the decoding process exceeds a reference load or not; and a prediction control unit 723 which outputs a control signal C7 according to the comparison output Vmo and a decision signal Lmo corresponding to the result of the decision in the load decision unit 721. Other constituents of the CPU 720 are identical to those of the CPU 220 of the second embodiment.

The prediction control unit 723 outputs a control signal C7 indicating a low-power consumption process when the monitor voltage is lower than the first reference voltage, outputs a control signal C7 indicating a normal process when the monitor voltage is equal to or higher than the second reference voltage, and outputs the output Lmo of the load decision unit 721 as a control signal C7 when the monitor voltage is equal to or higher than the first reference voltage and smaller than the second reference voltage.

Furthermore, the image decoding apparatus 700 includes a prediction unit 710 which switches generation of image data Pg of a prediction block between the first data-generation process and the second data-generation process in accordance with the control signal C7, in place of the prediction unit 210 of the image decoding apparatus 200 of the second embodiment.

In the prediction unit 710, based on the result of the comparison, when the power supply voltage Vd is lower than the first reference voltage, the first data-generation process is carried out, wherein pixel data of the prediction block specified by the motion vector of fractional pixel precision are generated according to pixel data of only K×K pixels included in the reference region Sr0 of the reference frame (refer to FIG. 2), the region Sr0 having the same size as the target block. On the other hand, when the power supply voltage Vd is equal to or higher than the second reference voltage, the second data-generation process is carried out, wherein pixel data of the prediction block are generated according to pixel data of K'×K' pixels positioned inside the reference region Sr of the reference frame SF (refer to FIG. 12(c)), the region Sr being larger than the target block.

Further, when the power supply voltage Vd is equal to or higher than the first reference voltage and lower than the second reference voltage, either the first data-generation process or the second data-generation process is carried out according to the output Lmo of the load decision unit 721. That is, the first data-generation process is carried out when the arithmetic load exceeds a predetermined reference value, and the second data-generation process is carried out when the arithmetic load does not exceed the reference value.

The reference region Sr corresponds to a region (extended reference region) comprising the reference region Sr0 and its peripheral region (the region where the duplicate pixels shown by ● are arranged) in FIG. 2(c).

Accordingly, an address generator 712 and a prediction signal generator 713 constituting the prediction unit 710 are identical to the address generator 212 and the prediction signal generator 213 except that the generators 712 and 713 receive the output (control signal) C7 from the prediction control unit 723 while the generators 212 and 213 receive the output (control signal) C2 from the load decision unit 221.

Other constituents of the image decoding apparatus 700 of this seventh embodiment are identical to those of the image decoding apparatus 200 of the second embodiment.

A description is given of the operation.

Figure 15:
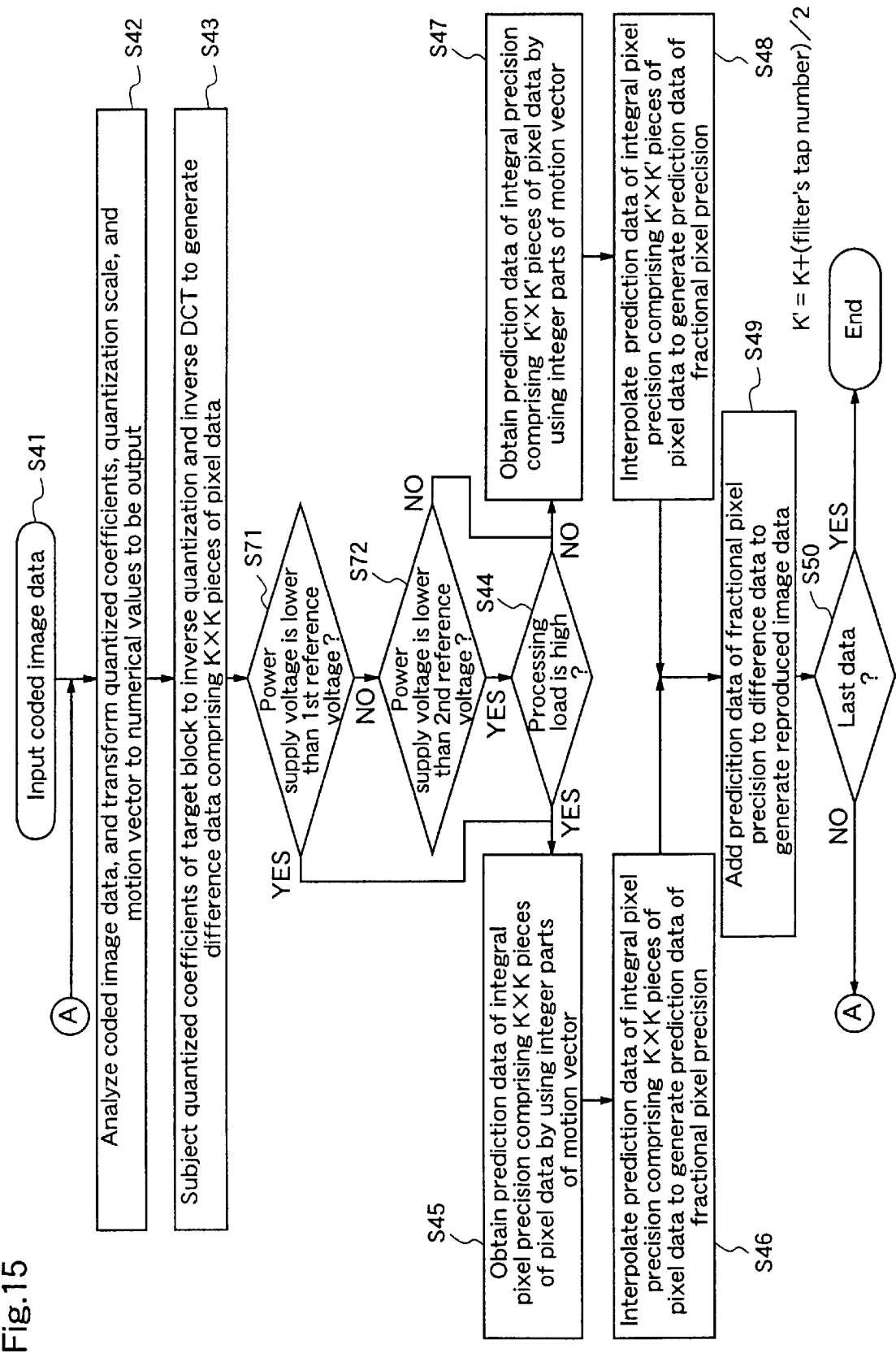
FIG. 15 is a flowchart for explaining predictive decoding by the image decoding apparatus of the seventh embodiment.

FIG. 15 is a flowchart for explaining a predictive decoding process by the image decoding apparatus of this seventh embodiment.

In the image decoding apparatus 200 of the second embodiment, generation of prediction data depends on whether the arithmetic load is larger than a threshold or not. In contrast with the second embodiment, in the image decoding apparatus 700 of this sixth embodiment, the process of the prediction unit 710 is switched between the first data-generation process and the second data-generation process, according to the result of comparison between the voltage Vd of the battery power supply 10 and the first and second reference voltages. Other operations of the image decoding apparatus 700 are identical to those of the image decoding apparatus 200 of the second embodiment.

More specifically, in the image decoding apparatus 700, when the voltage Vd of the battery power supply 10 is equal to or higher than the second reference voltage, the prediction unit 710 performs the first data-generation process. When the voltage Vd is lower than the first reference voltage, the prediction unit 710 performs the second data-generation process. Further, in the case where the voltage Vd is equal to or larger than the first reference voltage and lower than the second reference voltage, the first data-generation process is carried out when the arithmetic load exceeds the reference value, and the second data-generation process is carried out when the arithmetic load does not exceed the reference value.

Hereinafter, the operation of the image decoding apparatus 700 will be briefly described by using the flowchart of FIG. 15.

Initially, the following steps are carried out in the same manner as already described for the second embodiment: input of coded image data to the apparatus 700 (step S41); transformation of image data, such as DCT coefficients (quantized coefficients), quantization scale, and motion vector, from corresponding coded data to corresponding numerical data (step S42); and inverse quantization and inverse DCT by the decoder 103 (step S43).

Thereafter, in the power supply voltage monitor 721 of the CPU 720, the voltage Vd of the battery power supply 10 is compared with the first and second reference voltages (steps S71 and S72). Based on the result of the comparison, the method for generating prediction data from the pixel data in the reference frame by motion compensation is decided.

That is, when the voltage Vd of the battery power supply 10 is lower than the first reference voltage as the result of the comparison (step S71), the same processes as those of steps S24 and S25 of the first embodiment are carried out in steps S45 and S46, whereby prediction data for a target block are generated. On the other hand, when the voltage Vd is equal to or higher than the first reference voltage, the voltage Vd is compared with the second reference voltage (step S72).

Figure 17:
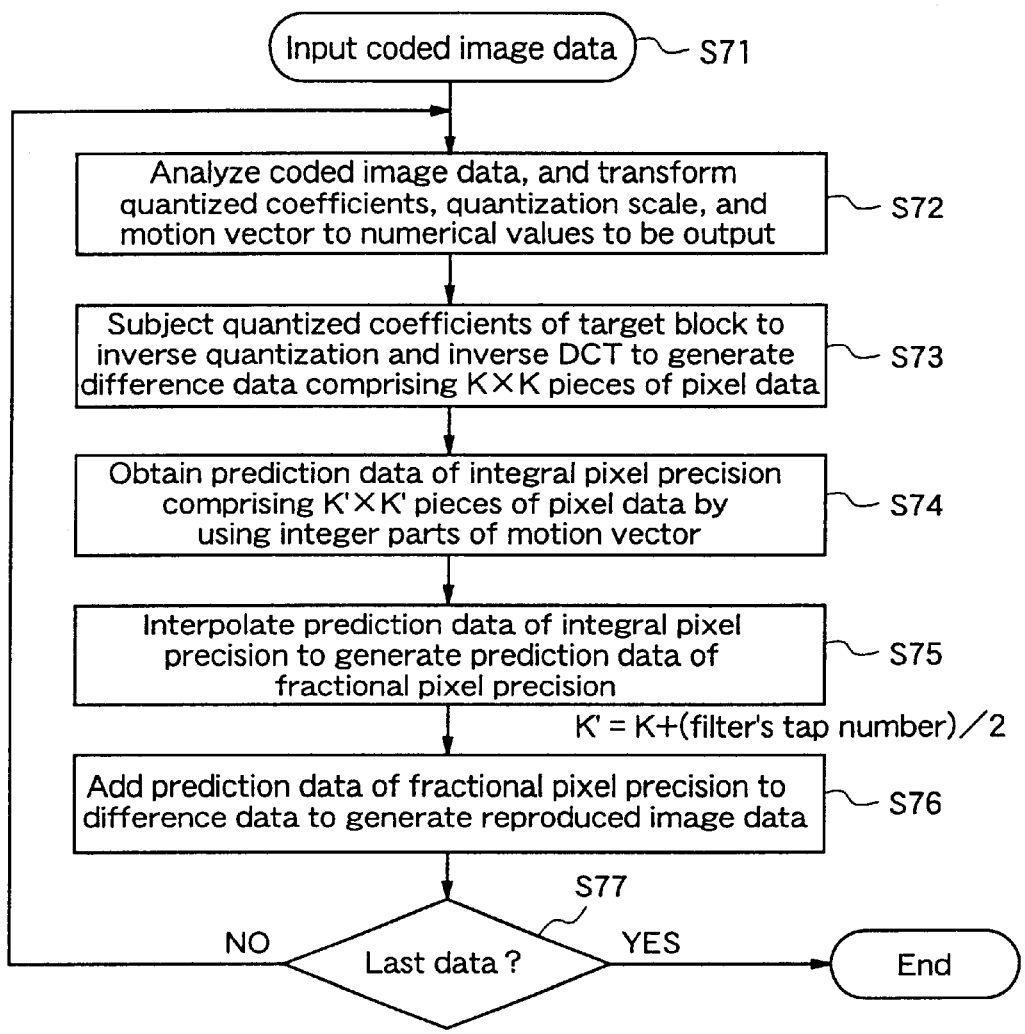
FIG. 17 is a flowchart for explaining an image decoding method according to the prior art.
Figure 18:
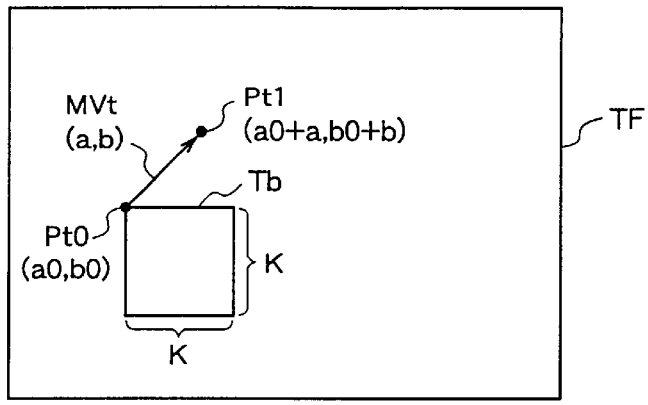
FIGS. 18(a)–18(c) are schematic diagrams for explaining motion compensation in the prior art image decoding method, wherein 18(a) shows a frame to be processed, 18(b) shows a reference frame, and 18(c) shows a reference region.
Figure 18:
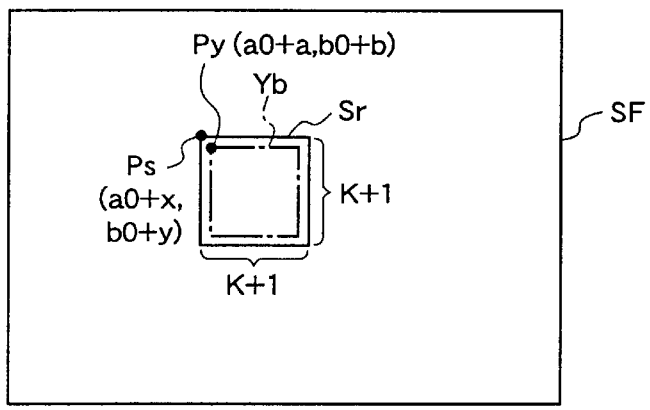
Figure 18:
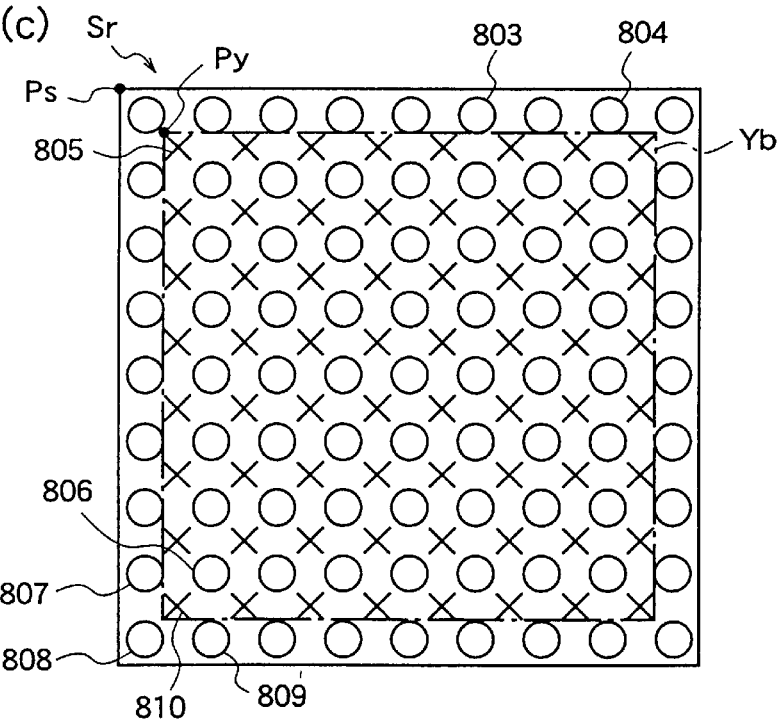

Based on the result of the comparison, when the voltage Vd is equal to or higher than the second reference voltage, the same processes as those of steps S74 and S75 of the prior art motion compensation shown in FIG. 17 are carried out in steps S47 and S48, whereby prediction data for a target block are generated. On the other hand, when the voltage Vd is lower than the second reference voltage, the arithmetic load decision unit 721 decides whether the arithmetic load on the decoding process exceeds a predetermined threshold or not (step S44).

Based on the result of the decision, when the arithmetic load on the decoding process exceeds the threshold, the same processes as those of steps S24 and S25 of the first embodiment are carried out in steps S45 and S46, whereby prediction data for a target block are generated. On the other hand, when the arithmetic load does not exceed the threshold, the same processes as those of steps S74 and S75 of the prior art are carried out in steps S47 and S48, whereby prediction data of a target block are generated.

Thereafter, in the adder 105, the prediction data so generated and the above-described restored data (difference data) are added to generate reproduced data Rg of the target block (step S49), and it is decided whether or not the target block is the last block in the last frame among the frames constituting the image (step S50).

When the target block is not the last block, the processes of steps S41–43, S71, S72, and S44–S50 are performed again. When the target block is the last block, the decoding process is ended.

In this seventh embodiment of the present invention, when coded image data are decoded in predetermined block units in the image decoding apparatus driven by the battery power supply, the prediction process for calculating prediction data for a target block from pixel data of a reference frame is carried out according to the motion vector of the target block. In the prediction process, according to the voltage of the battery power supply and the arithmetic load on the decoding process, the process to obtain the prediction data based on the motion vector of fractional pixel precision is switched between the first process using only M×N pixels included in the reference region of the same size as the target block, and the second process using P×Q (P=integer larger than M, Q=integer larger than M) pixels included in the extended reference region comprising the reference region and its periphery. Therefore, when the voltage of the battery power supply is sufficiently high, since the second process to generate prediction data is carried out, image reproduction can be performed while maintaining the best image quality.

Further, when the voltage of the battery power supply falls slightly, image reproduction is performed by switching the process to obtain prediction data between the first process and the second process in accordance with the arithmetic load on the decoding process.

Moreover, even when the voltage of the battery power supply falls significantly, since the first process is performed to obtain prediction data, an image of smooth motion can be reproduced without substantial degradation of image quality and interruption of decoding.

In this way, accurate control according to the voltage of the battery power supply and the arithmetic load is realized in the image decoding apparatus driven by the battery, whereby reproduction an image of smooth motion can be carried out for many hours without substantial degradation of image quality and interruption of decoding.

In this seventh embodiment, in the image decoding apparatus driven by the battery power supply, generation of prediction data in the prediction unit is switched between the first data-generation process of relatively light arithmetic load and the second data-generation process of relatively heavy arithmetic load, according to whether the voltage of the battery power supply is lower than a reference voltage or not and whether the arithmetic load is larger than a predetermined threshold or not. However, such switching of the data generating process in the prediction unit may be performed in a coding process.

For example, the image coding apparatus 400 of the fourth embodiment shown in FIG. 8 may include, in place of the CPU 420, a CPU including a power supply voltage monitor which measures the voltage of a battery power supply of the coding apparatus and compares the measured voltage with first and second reference voltages; a load decision unit which decides whether the arithmetic load is larger than a predetermined threshold or not; and a prediction control unit which outputs a control signal according to the result of the decision for the battery voltage and the result of the decision for the arithmetic load. Further, the prediction unit of the image coding apparatus 400 may be constructed as follows. That is, the prediction unit performs the first data-generation process when the voltage of the battery power supply is equal to or higher than the second reference voltage (higher reference voltage), and performs the second data-generation process when the voltage of the battery power supply is lower than the first reference voltage (lower reference voltage) and, furthermore, in the case where the voltage of the battery power supply is equal to or higher than the first reference voltage and lower than the second reference voltage, the prediction unit performs the first data-generation process when the arithmetic load exceeds the threshold and performs the second data-generation process when the arithmetic load does not exceed the threshold.

Moreover, in the aforementioned embodiments of the invention, when performing the second data-generation process in the prediction unit, pixel data corresponding to 9×9 pixels constituting one block are read from the frame memory 111 or 311. However, in the second data-generation process, pixel data corresponding to 8×8 pixels, 8×9 pixels, or 9×8 pixels may be read from the frame memory, according to the precision of the motion vector MV.

For example, when the values (horizontal component and vertical component) of the motion vector input to the prediction unit are expressed with 0.5 pixel precision, pixel data corresponding to 9×9 pixels are read from the frame memory in the second data-generation process. When the horizontal component of the motion vector is expressed with 1 pixel precision while the vertical component thereof is expressed with 0.5 pixel precision, pixel data corresponding to 8×9 pixels are read from the frame memory in the second data-generation process. When the horizontal component of the motion vector is expressed with 0.5 pixel precision while the vertical component thereof is expressed with 1 pixel precision, pixel data corresponding to 9×8 pixels are read from the frame memory in the second data-generation process. Further, when both of the horizontal and vertical components of the motion vector are expressed at 1 pixel precision, pixel data corresponding to 8×8 pixels are read from the frame memory in the second data-generation process.

Furthermore, in the aforementioned embodiments, emphasis has been placed on a decoding or coding method based on MPEG1 in which an image corresponding to one frame is processed without dividing it into a plurality of objects composing the image. However, a coding method based on MPEG4 in which image data corresponding to plural objects composing one image (one frame) are compressively coded object by object, is also within the scope of the invention. Further, a decoding method adapted to the coding method based on MPEG4 is also within the scope of the invention.

When a coding or decoding program for implementing the structure of the coding or decoding apparatus according to any of the aforementioned embodiments is recorded in a storage medium such as a floppy disk, the process according to any of the aforementioned embodiments can be easily implemented in an independent computer system.

Figure 16:
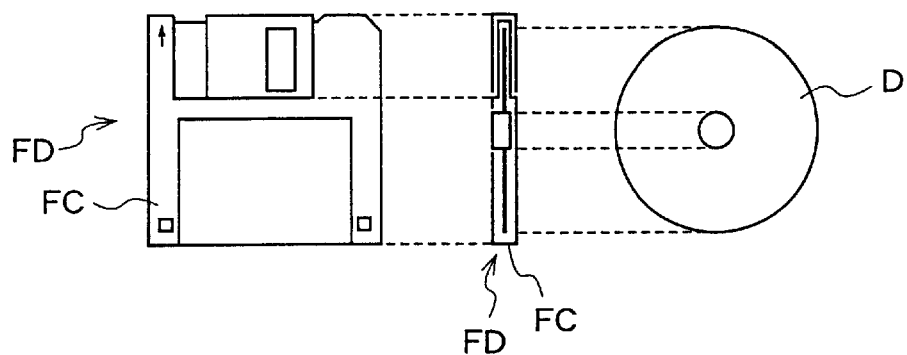
FIGS. 16(a)–16(c) are diagrams for explaining data storage medium containing a program for implementing image processing by an image processing apparatus according to any of the aforementioned embodiments, by using a computer system, wherein 16(a) shows the schematic structure of a floppy disk, 16(b) shows a disk body, and 16(c) shows a computer system.
Figure 16:
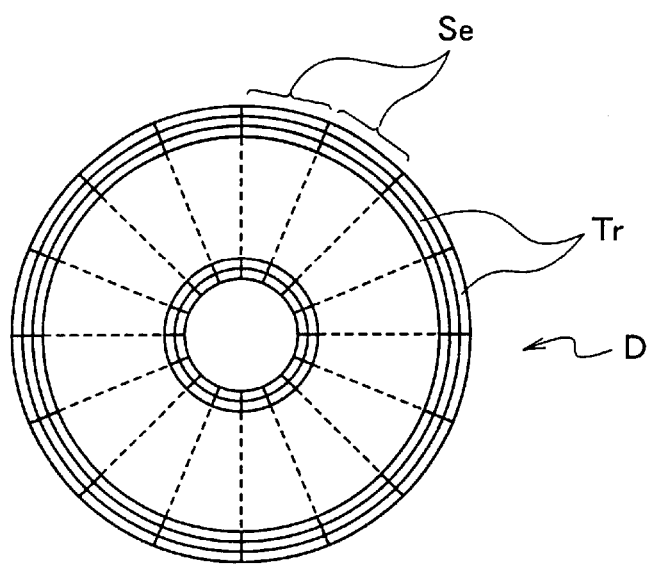
Figure 16:
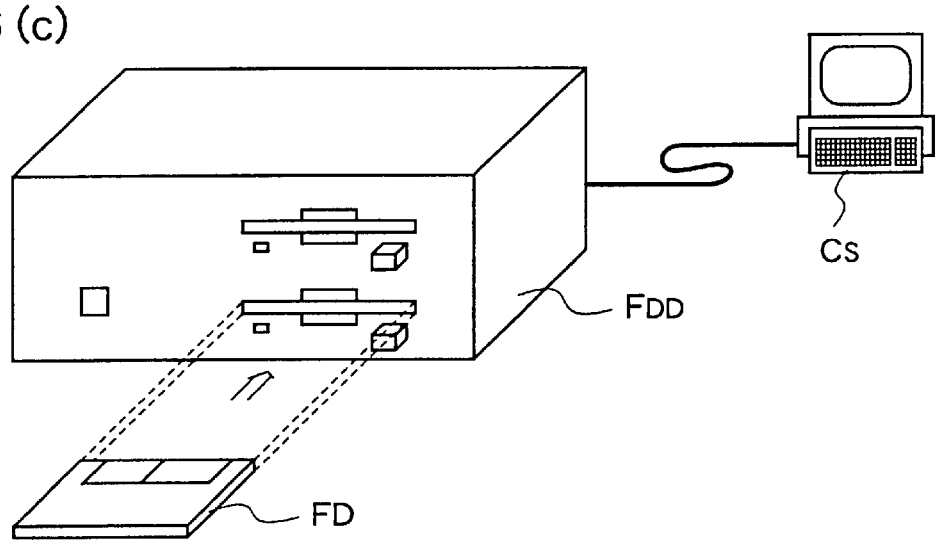

FIGS. 16(a)–16(c) are diagrams for explaining the case where the decoding process according to the first or second embodiment or the coding process according to the third or fourth embodiment is executed by a computer system using a floppy disk which contains the decoding or coding program.

FIG. 16(a) shows a front view of a floppy disk FD, a cross-sectional view thereof, and a floppy disk body D. FIG. 16(b) shows an example of a physical format of the floppy disk body D. The floppy disk body D is contained in a case FC. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 16(c) shows the structure for recording/reproducing the program in/from the floppy disk FD. When the program is recorded in the floppy disk FD, data of the program are written in the floppy disk FD from the computer system Cs through the floppy disk drive FDD. When the above-mentioned image coding or decoding apparatus is constructed in the computer system Cs by the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, decoding and coding can be performed by software in like manner as described above. The data storage medium is not restricted to these disks, and any medium (e.g., an IC card or a ROM cassette) may be employed as long as it can contain the program.

What is claimed is:

1. An image processing method including a decoding process in which coded image data obtained by compressively coding image data comprising pixel data of plural pixels by a predetermined method are decoded in block units each comprising M×N pieces of pixels (M,N=positive integers), the decoding process being performed for each frame comprising plural blocks to generate reproduced image data of each frame, said method comprising:

restoring the coded image data to generate restored data of a target block to be subjected to the decoding process;

selecting, as a reference frame, at least one of previous frames for which reproduced image data have been generated previously to a target frame including the target block, and calculating prediction values for reproduced image data of the target block, from the reference frame, in accordance with a motion vector of the target block; and generating reproduced image data of the target block by adding the restored data of the target block and the prediction values for reproduced image data of the target block;

wherein, in said selecting and calculating, an approximate value of reproduced image data of a prediction block specified by a motion vector having fractional pixel precision are generated by employing fractional pixel precision as prediction values for reproduced image data of the target block in accordance with pixel data of pixels included in a reference region specified in accordance with an integer part of the motion vector value on the reference frame, the reference region having the same size as the target block; and wherein the reference region having the same size as the target block includes M×N pieces of pixels, a number which is smaller than that of pixels required for generating reproduced image data of the prediction block in accordance with the motion vector having fractional pixel precision.

2. The image processing method of claim 1 wherein said selecting and calculating further comprises:

obtaining the pixel data of the M×N pixels included in the reference region having the same size as the target block, by using integer parts of the values of the motion vector having fractional pixel precision; and subjecting the obtained pixel data of the M×N pixels to interpolation by using fraction parts of the values of the motion vector having fractional pixel precision, thereby generating an approximate value of reproduced image data of the prediction block specified by the motion vector having fractional pixel precision.

3. A data storage medium which contains a program implementing image processing by a computer, said program enables the computer to perform image processing according to the image processing method defined in claim 1.

4. The processing method of claim 2 wherein said subjecting included in said selecting and calculating generates pixel data of interpolation pixels positioned at the boundary of the reference region having the same size as the target block by interpolation using only pixel data of the pixels positioned adjacent to the boundary of the reference region, amongst the pixel data of the M×N pixels obtained from the reference frame.

5. A data storage medium which contains a program implementing image processing by a computer, said program enables the computer to perform image processing according to the image processing method defined in claim 2.

6. A data storage medium which contains a program implementing image processing by a computer, said program enables the computer to perform image processing according to the image processing method defined in claim 4.

7. An image processing apparatus performing a decoding process in which coded image data obtained by compressively coding image data comprising pixel data of plural pixels by a predetermined method are decoded in block units each comprising M×N pieces of pixels (M,N=positive integers), the decoding process being performed for each frame comprising plural blocks to generate reproduced image data of each frame, said apparatus comprising:

a frame memory operable to store reproduced image data of desired frames;

a data analyzer operable to analyze the coded image data, and output compressed image data and a motion vector which correspond to a target block to be subjected to the decoding process;

a decoder operable to decompress the compressed image data of the target block to generate restored data of the target block;

a prediction unit operable to calculate a prediction values for the reproduced image data of the target block, from reproduced image data of a reference frame stored in said frame memory, in accordance with the motion vector of the target block; and an adder operable to add the restored data of the target block and prediction values for the reproduced image data of the target block to generate reproduced image data corresponding to the target block, and output the reproduced image data to said frame memory;

wherein said prediction unit is operable to generate an approximate value of reproduced image data of a prediction block specified by the motion vector having fractional pixel precision by employing fractional pixel precision as prediction values for reproduced image data of the target block, in accordance with pixel data of pixels included in a reference region specified in accordance with an integer part of the motion vector value on the reference frame, the reference region having the same size as the target block; and wherein the reference region having the same size as the target block includes M×N pieces of pixels, a number which is smaller than that of pixels required for generating reproduced image data of the prediction block in accordance with the motion vector having fractional pixel precision.

* * * * *